(12) United States Patent
Sutton et al.

(10) Patent No.: US 9,778,952 B1
(45) Date of Patent: Oct. 3, 2017

(54) MIGRATION OF COMPUTER SYSTEM IMAGES THROUGH A CUSTOMER INTERFACE

(71) Applicant: Amazon Technologies, Inc., Reno, NV (US)

(72) Inventors: Wesley Marlin Sutton, San Francisco, CA (US); Raviprasad Venkatesha Murthy Mummidi, Mountain View, CA (US); Karthikeyan Natarajan, San Jose, CA (US); Long Kim Do, San Jose, CA (US); Derek Avery Lyon, San Francisco, CA (US); Keshav Sethi Attrey, Campbell, CA (US); Hariharan Subramanian, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 14/317,542

(22) Filed: Jun. 27, 2014

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/48* | (2006.01) |
| *G06F 9/54* | (2006.01) |
| *G06F 3/0484* | (2013.01) |

(52) U.S. Cl.
CPC .......... *G06F 9/4856* (2013.01); *G06F 3/0484* (2013.01); *G06F 3/04845* (2013.01); *G06F 9/541* (2013.01)

(58) Field of Classification Search
CPC .................................................... G06F 9/4856
USPC ........................................................ 719/328
See application file for complete search history.

(56) References Cited

U.S. PATENT DOCUMENTS

| | | | |
|---|---|---|---|
| 8,352,608 B1 * | 1/2013 | Keagy ....................... | G06F 8/63 709/220 |
| 2008/0134177 A1 * | 6/2008 | Fitzgerald ............... | G06F 21/51 718/1 |
| 2014/0280948 A1 * | 9/2014 | Schmidt ................ | H04L 47/827 709/226 |

* cited by examiner

*Primary Examiner* — Timothy A Mudrick
(74) *Attorney, Agent, or Firm* — Davis Wright Tremaine LLP

(57) ABSTRACT

A customer network client detects, through a user interface, selection of a graphical representation of a set of virtual machine images and an indication to migrate this set of virtual machine images to an off-premises network managed by a computing resource service provider. In response, the client generates a set of application programming interface calls, which may be transmitted to the service provider and causes the service provider to convert the selected images for use within the off-premises network. The client monitors fulfillment of the calls and, upon determining that the calls has been fulfilled, updates a portion of the user interface associated with the computing resource service provider to indicate that the images may be instantiated within the off-premises network.

24 Claims, 10 Drawing Sheets

MIGRATION OF COMPUTER SYSTEM IMAGES THROUGH A CUSTOMER INTERFACE

BACKGROUND

Customers utilize one or more applications provided by a computing resource service provider or other service provider to manage resources in a data center operated by the customers (e.g., on-premises) or in a remote network (e.g., off-premises), dependent on the customers' business needs. The one or more applications may be configured to enable a customer to migrate resources between their on-premises network environment and off-premises network environments, such as a computing resource service provider network environment. However, a customer desiring to maintain a variety of resources on-premises and off-premises may encounter numerous difficulties. For instance, a customer desiring to migrate resources between their on-premises network environment and off-premises network environments may need to access the off-premises network, provision and configure resources within the off-premises network to perform the migration. This, in turn, may be a labor-extensive and time-extensive task, which may increase the burden on the customers and other users that may rely on these resources.

BRIEF DESCRIPTION OF THE DRAWINGS

Various embodiments in accordance with the present disclosure will be described with reference to the drawings, in which.

DETAILED DESCRIPTION

Figure 1:
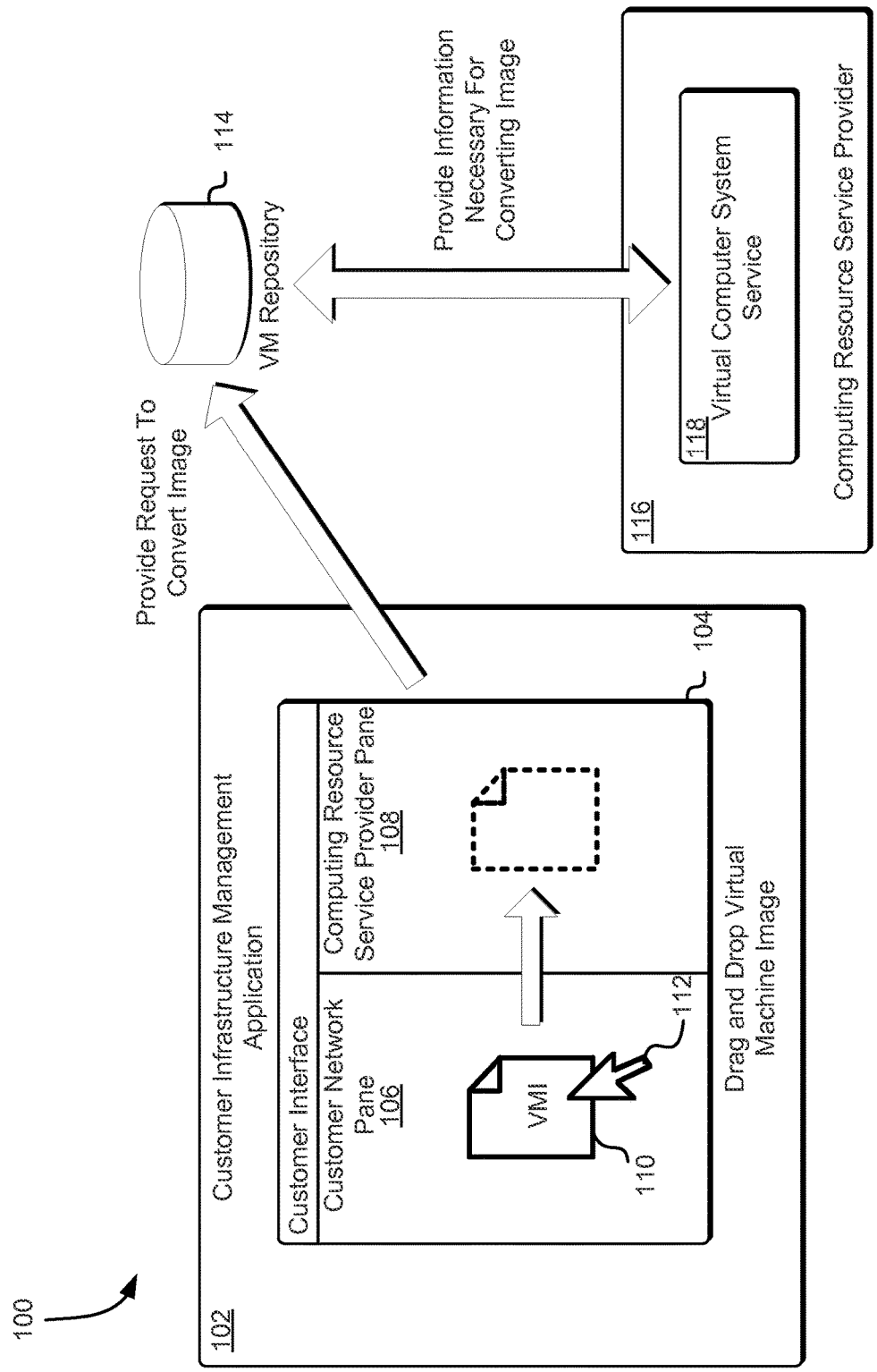
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the configuration and use of a graphical user interface (GUI) for migration of a virtual machine image from an on-premises network to an off-premises network. In an embodiment, an entity (e.g., an organization) utilizes, within an on-premises network and through associated computing devices, an on-premises network management application to access an interface. The interface may include an on-premises network window pane, which may be configured to illustrate graphical representations of virtual machine images available to the entity within the on-premises network. Additionally, the interface may include an off-premises network (e.g., computing resource service provider) window pane, which may be configured to illustrate graphical representations of virtual machine images available to the entity within this off-premises network. The entity may utilize a cursor within the interface to select, drag and drop graphical representations of virtual machine images from the on-premises network window pane to the off-premises network window pane, and vice versa. The entity may be a customer of a computing resource service provider that operates various services such as a virtual computer system service, object-based data storage services, database services and a plurality of other services. While GUIs and graphical representations are used extensively throughout the present disclosure for the purpose of illustration, other non-graphical interfaces may be utilized.

When the entity drags and drops a graphical representation of a virtual machine image from an on-premises window pane to an off-premises window pane, an on-premises client may detect and interpret these actions as a request to migrate a virtual machine image from the on-premises network to the off-premises network. In response to the request, the on-premises client may access a virtual machine image repository within the on-premises network and obtain the selected virtual machine image. In an embodiment, the on-premises client generates and submits a request to an off-premises virtual computer system service, such as an application programming interface (API) call to the service, to convert the virtual machine image and make the virtual machine image available for use within the off-premises network. The on-premises client may be configured to monitor the off-premises network to determine whether the virtual machine image has been converted and made available for use.

In an embodiment, the off-premises virtual computer system service receives the API call from the on-premises client and determines whether the entity is authorized to migrate a virtual machine image to the off-premises network. If the entity is not authorized to migrate the selected virtual machine image to the off-premises network, the virtual computer system service may deny the request and cause the interface to display an error message. If the entity is authorized to migrate the selected virtual machine image to the off-premises network, the virtual computer system service may determine the specifications of the virtual machine image and utilize these specifications to convert the virtual machine image in order to enable use of the virtual machine image (e.g., instantiation of the image) within the off-premises network. Once the virtual computer system service has converted the virtual machine image for use within the off-premises network, the virtual computer system service may store the virtual machine image within an off-premises virtual machine image repository and update the entity catalog to specify that the newly converted virtual machine image is available.

Upon detecting that the virtual machine image has been converted and stored within the off-premises network, the on-premises client may update the user interface to specify that the virtual machine image is now available for use within the off-premises network. For instance, in an embodiment, the on-premises client will update the interface to include a graphical representation of the converted virtual machine image within the off-premises network window pane. This may enable the entity to utilize the interface to select the converted virtual machine image and cause, within the off-premises network, the selected virtual machine image to be loaded onto hardware provided by the computing resource service provider and instantiated to generate a new virtual machine instance.

In this manner, an entity may be able to utilize a graphical user interface to migrate virtual machine images from an on-premises network to an off-premises network and be able to utilize these virtual machine images within the off-premises network. In addition, the techniques described and suggested herein facilitate additional technical advantages. For example, because the virtual computer system service within the off-premises network is configured to determine whether the entity is authorized to migrate a virtual machine instance from the on-premises network to the off-premises network, no unauthorized entities may be permitted to introduce potentially malicious virtual machine images into the off-premises network or, alternatively from the off-premises network to the on-premises network.

FIG. 1 shows an illustrative example of an environment 100 in which various embodiments can be implemented. In the environment 100, a customer may utilize, through one or more associated computing devices (e.g., a client), a customer infrastructure management application 102 to access a customer interface 104. The customer may be an individual, organization or automated process that could utilize one or more services provided by the computing resource service provider 116 to provision and manage one or more resources to support his or her operations. The customer may further be an administrator or other user of a customer network, which may include a plurality of computing hardware resources which may be located at least in part on the customer premises. In some embodiments, the computing hardware resources that may be included within the customer network include hardware servers, data storage devices, network devices and other equipment, such as server racks, networking cables and the like. The customer may utilize these computing hardware resources to operate one or more services, which may be utilized by the customer or other users to access computer system resources within the customer network. Accessing computer system resources may include creating resources, updating resources, deleting resources, obtaining information about the resources and the like. While a customer infrastructure management application 102 is utilized to access the customer interface 104 in some embodiments, there may be other embodiments in which the customer interface 104 may be accessed by the customer through one or more services provided by the computing resource service provider 116. For instance, in an embodiment, the virtual computer system service 118 includes the customer interface 104, which may enable the customer to manage one or more resources within the computing resource service provider 116 network as well as the customer network.

The customer interface 104 may enable a customer to visualize and access one or more resources within a first computing environment and a second computing environment, such as the customer network and an off-premises network managed and maintained by a computing resource service provider 116. In order to enable the customer to visualize these one or more resources, the customer interface 104 may be divided into one or more window panes 106, 108, which may be configured to illustrate one or more graphical representations of the customer's resources available within the customer network, as well as in other networks. For instance, as illustrated in FIG. 1, the customer interface 104 includes two distinct window panes: a customer network pane 106 and a computing resource service provider pane 108.

The customer network pane 106 may be configured to generate a graphical representation of one or more customer resources that may be available to the customer within the customer network. For instance, the customer network pane 106 may include a graphical representation of one or more virtual machine images 110 that may be stored within a virtual machine image repository 114 within the customer network. The computing resource service provider pane 108 may be configured to generate a graphical representation of one or more customer resources that may be available to the customer within a computing resource service provider network or other off-premises network. For instance, in an embodiment, the customer interface communicates with a virtual computer system service 118 provided by the computing resource service provider 116 to identify one or more customer resources that may be available to the customer. Once the customer interface 104 has determined what customer resources are available, the customer interface 104 may populate the computing resource service provider pane 108 to include a graphical representation of the one or more resources that may be available to the customer.

In an embodiment, the customer or other user can utilize a cursor 112 or other interface device to select graphical representations of one or more virtual machine images 110 from within the customer network pane 106 and introduce these graphical representations of the one or more virtual machine images 110 into the computing resource service provider pane 108. The customer interface 104 may detect this action and, based at least in part on the selected graphical representations of the one or more virtual machine images 110, access a virtual machine image repository 114 within the customer network to obtain one or more virtual machine images 110 that correspond to the selected graphical representations of the one or more virtual machine images 110. While using a cursor 112 to drag and drop graphical representations of virtual machine instances 110 between window panes 106, 108 for migration of virtual machine images 110, other methods may be utilized to request migration of one or more virtual machine images 110 through the customer interface 104. For instance, in an embodiment, a customer may utilize the cursor 112 to select a graphical representation of one or more virtual machine images 110 within a window pane 106, 108. This selection may result in the appearance of a menu, which may enable the customer to select, from the menu, an option to migrate the selected virtual machine images 110. While virtual machine images are used extensively throughout the present disclosure for the purpose of illustration, other computer system images may be utilized that do not require virtualization.

In response to the customer having utilized a cursor 112 to drag and drop a graphical representation of a virtual machine image 110 from a customer network pane 106 to a computing resource service provider pane 108, the customer interface 104 may access a virtual machine image repository 114 to obtain the selected virtual machine image 110 and prepare this virtual machine image for migration. Once the customer interface 104 has obtained the selected virtual machine images 110 from the virtual machine image repository 114, the customer interface 104 may generate and transmit one or more API calls to a virtual computer system service 118 provided by the computing resource service provider 116 to initiate conversion of the selected virtual machine images 110. The computing resource service provider 116 may be an organization that hosts various computing resources on behalf of one or more customers. For example, a computing resource service provider 116 may operate one or more facilities that are used to host various computing hardware resources, such as hardware servers, data storage devices, network devices and other equipment, such as server racks, networking cables and the like. The computing resource service provider 116 may utilize its computing hardware resources to operate one or more services. Such services may include services that enable customers of the computing resource service provider 116 to remotely manage computing resources to support the customers' operations while reducing the needs of the customers to invest in physical equipment. Example services include, but are not limited to, various data storage services (object-based data storage services, archival data storage services, database services and the like), identity management services, program execution services and other services. The services may be used by customers to support a wide variety of activities, such as operating a website, operating enterprise systems supporting an organization, distributed computation and/or other activities.

The one or more API calls transmitted to the virtual computer system service 118 may include the one or more virtual machine images 110 obtained from the virtual machine image repository 114, as well as a set of credentials that may be utilized to determine whether the customer is authorized to migrate virtual machine instances to computing resource service provider 116 network. For instance, in an embodiment, the customer interface 104 introduces a token (e.g., cookie) associated with the customer that specifies one or more policies defining permissions for the customer within the computing resource service provider 116 network, as well as other information that may be used by the computing resource service provider to verify the authentication of the customer (e.g., secret signing key). The computing resource service provider 116 may evaluate the policy within the token to determine whether the policy is still valid. If the policy is still valid, the computing resource service provider may allow migration of the selected virtual machine images 110 to the computing resource service provider 116 network. In an embodiment, the on-premises network determines the authentication and authorization of the customer to perform migration of the one or more virtual machine images 110 from the on-premises network to the off-premises network. Thus, in such instances, the customer interface 104 may not be required to introduce the token.

If the virtual computer system service 118 is able to determine that the customer is authorized to migrate the provided virtual machine images 110, the virtual computer system service 118 may determine, such as through evaluation of metadata included with the virtual machine images 110, the specifications of the provided virtual machine images 110. These specifications may enable the virtual computer system service 118 to convert and store these virtual machine images 110 within a repository managed by the computing resource service provider 116. The virtual computer system service 118 may additionally update a customer catalog to further specify that the converted virtual machine images are now available to the customer. In an embodiment, the virtual computer system service 118 converts the root file system for each of the provided virtual machine images 110 to emulate the devices utilized within the on-premises network within the computing resource service provider 116 network. For instance, the virtual computer system service 118 may utilize this converted root file system to identify one or more block-level data storage volumes that, in turn, may be mounted as a storage device (e.g., hard drive) that may be used to instantiate the converted one or more virtual machine images.

During the conversion process, the customer interface 104 may monitor the virtual computer system service 118 to determine whether the provided virtual machine images 110 have been converted successfully. If the provided virtual machine images 110 have been successfully converted and stored, the customer interface 104 may update the computing resource service provider pane 108 to include a graphical representation of the converted one or more virtual machine images. This may enable the customer to select any of the converted one or more virtual machine images and create a new virtual machine instance within the computing resource service provider 116 network.

Figure 2:
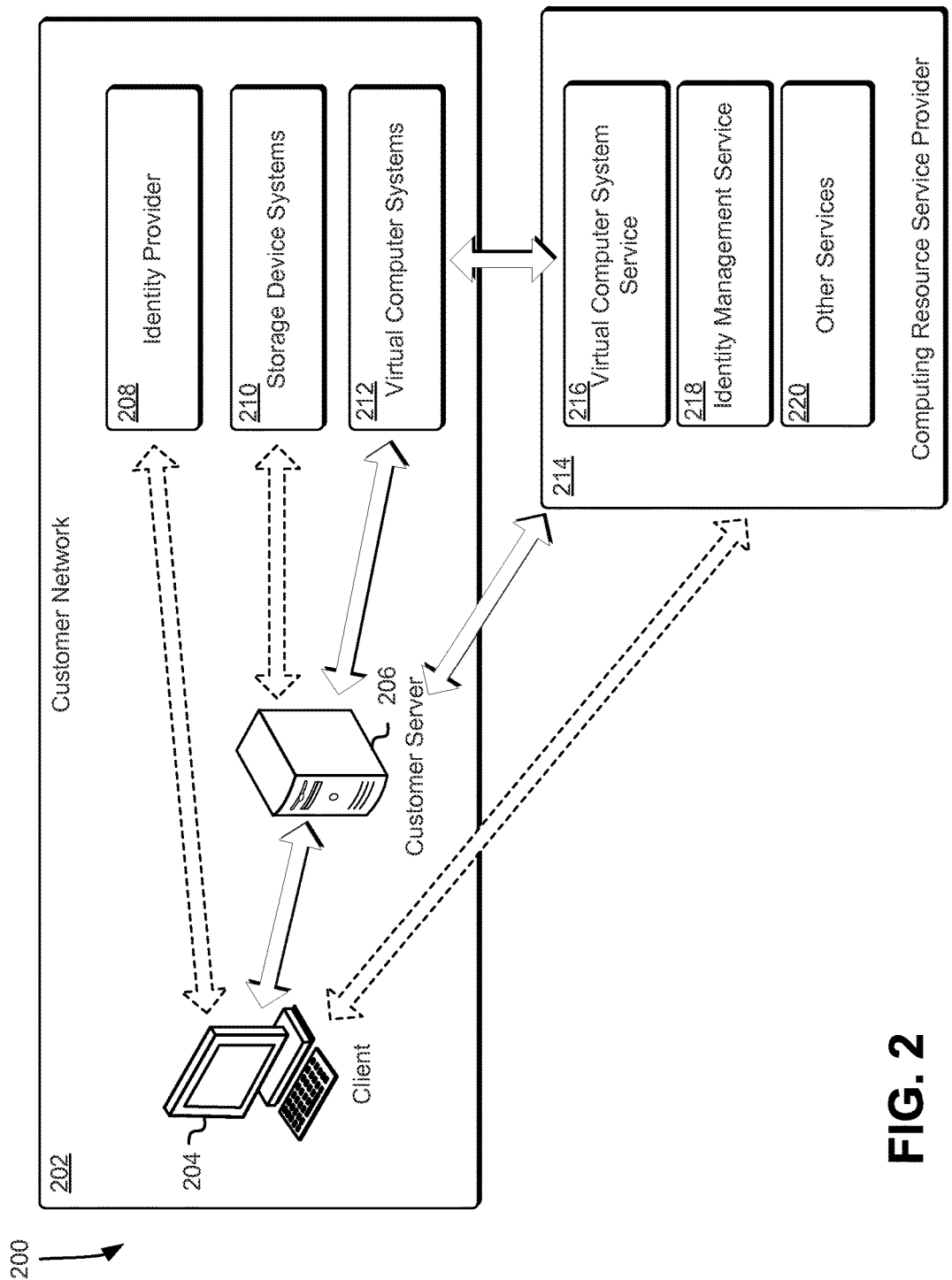
FIG. 2 shows an illustrative example of an environment in which a user client is utilized to access services provided by a computing resource service provider in accordance with at least one embodiment.

As noted above, a customer may utilize a customer network interface through a client to migrate one or more virtual machine images from the customer network to an off-premises network, such as the computing resource service provider network. Accordingly, FIG. 2 shows an illustrative example of an environment 200 in which a user client is utilized to access one or more services provided by a computing resource service provider 214 in accordance with at least one embodiment. In the environment 200, a user may utilize a client 204 to access a customer server 206 within a customer network 202 to access one or more services provided by the customer. The client 204 may be a computing device configured to communicate, on behalf of a user, with a customer server 206 to access one or more systems provided by the customer in the customer network 202. For instance, the client 204 may be a thin client configured to enable users of the client 204 to utilize one or more applications or graphical user interfaces (GUIs) to access these one or more systems to perform a series of operations. These operations may be requested by the user on behalf of the customer to support the customer's business needs. Additionally, the client 204 may be utilized by the customer to access the customer network 202 to perform, among other things, administrative tasks with regard to one or more systems provided by the customer in the customer network 202.

The customer network 202 may include a plurality of systems and other components, which may be used by the customer and other users of the customer network 202 to perform one or more operations to support the customer's needs. For instance, as illustrated in FIG. 2, the customer network 202 may include a customer server 206. The customer server 206 may include one or more computing hardware devices (e.g., hard drives, RAM, one or more processors, network devices, etc.) collectively configured to enable a user, through a client 204 to access one or more customer systems. For example, the customer server 206 may be configured to operate one or more storage device systems 210, virtual computer systems 212 and other systems within the customer network 202. The customer may configure the customer server 206 to refer to one or more user roles when a user utilizes a client 204 to access the customer server 206. For instance, when the user utilizes the client 204 to provide one or more credentials to access the customer server 206 on the customer network 202, the customer server 206 may utilize these credentials to authenticate the user and identify, based at least in part on the user roles for this particular user, which systems the user may access.

The user may additionally use the client 204 to access, from the customer network 202, the computing resource service provider 216 to access customer resources that may be made available off-premises (e.g., through a network managed by the computing resource service provider 214). In order to access the computing resource service provider 214, the user may utilize the client 204 to access one or more applications that may be used for establishing a connection to the computing resource service provider 216. When the user interacts with these one or more applications, the client 204 may transmit the request to access the computing resource service provider 214 to an identity provider 208 within the customer network 202 to obtain a security document that may be used to authenticate the user within the computing resource service provider 214 network. If the user is successfully authenticated, the computing resource service provider 214 may utilize a mapping of user identities within the customer network 202 to one or more policies, usable for defining a level of access to one or more resources within the computing resource service provider 214 network, for each user identity and generate a token usable to provide information to a computing resource service provider 214 interface. The token may include a digital signature, which may be used by the computing resource service provider 214 to verify the identity of the user and ensure the user has been properly authenticated through the customer network 202.

As noted above, the customer or other user may utilize the client 204 to access a customer network interface. This interface may enable the customer and/or other users to view a graphical representation of one or more virtual machine images that may be available to the customer or other user within the customer network 202. For instance, when the customer or other user accesses the customer network interface, the client 204, through the customer server 206, may access a virtual machine image repository (not shown) to identify the virtual machine images that may be available to the customer or other user and generate, based at least in part on the identified virtual machine images, a graphical representation of these one or more virtual machine images. Additionally, the client 204 may communicate with the virtual computer system service 216 provided by the computing resource service provider 214, such as through one or more API calls to the service, to identify any virtual machine images that may be available to the customer or other user within the computing resource service provider 214 network. The client 204 may cause the customer network interface to display graphical representations of the one or more virtual machine images that may be available to the customer or other user within the customer network 202, as well as within the computing resource service provider 214 network.

If the customer or other user utilizes the interface to drag and drop a graphical representation of one or more virtual machine images from a customer network 202 pane to a computing resource service provider 214 pane, as illustrated in FIG. 1, the client 204, through the customer server 206, may access the virtual machine image repository to obtain the selected one or more images for migration. Once the client 204 has obtained the selected one or more virtual machine images from the virtual machine image repository, the client 204 may generate an API call for the virtual computer system service 216, which may cause the virtual computer system service 216 to convert and store the selected one or more virtual machine images within a virtual machine image repository within the computing resource service provider 214 network. The API call may include a request to migrate the selected one or more virtual machine images to the computing resource service provider 214 network, the selected one or more virtual machine images and the token, which may be used by the computing resource service provider 214 to verify the identity of the user and ensure the user has been properly authenticated through the customer network 202. In an embodiment, the API call further includes licensing information that may be necessary in order to provide the computing resource service provider 214 permission to utilize the selected one or more virtual machine images within the computing resource service provider 214 network. Additionally, the API call may further include one or more policies that the computing resource service provider 214 may utilize to determine which one or more users may utilize the selected one or more virtual machine images within the computing resource service provider 214 network.

While migration of virtual machine images is used extensively throughout the present disclosure for the purpose illustration, other operations may be performed to introduce the selected one or more virtual machine images to the computing resource service provider 214 network. For instance, in an embodiment, a customer may, through the interface, drag and drop a graphical representation of one or more virtual machine images from a customer network 202 pane to a computing resource service provider 214 pane to request that these one or more virtual machine images be translated (e.g., copied, transferred or migrated) from the customer network 202 to the computing resource service provider 214 network. The client 204 may obtain a copy of the selected one or more virtual machine images and generate an API call for the virtual computer system service 216 that includes these copied virtual machine images.

In an alternative embodiment, the client 204 causes the customer server 206 to transmit one or more API calls to the virtual computer systems 212 within the customer network 202 to request translation of the selected one or more virtual machine images to the computing resource service provider 214 network. In response to the API calls from the customer server 206, the virtual computer systems 212 may obtain the selected one or more virtual machine images from the virtual machine image repository within the customer network 202 and provide these one or more virtual machine images to the customer server 206. Subsequently, the customer server 206 may transmit one or more API calls to the virtual computer system service 216 within the computing resource service provider 214 network to request conversion of the one or more virtual machine images and to cause these converted one or more virtual machine images to be stored within a virtual machine image repository within the computing resource service provider 214 network. Additionally, these one or more API calls may cause the virtual computer system service 216 to make these one or more converted virtual machine images to be available for instantiation. Alternatively, the customer server 206 may transmit one or more API calls to the virtual computer systems 212 to cause the virtual computer systems 212 to migrate the selected one or more virtual machine images directly to the virtual computer system service 216.

Once the virtual computer system service 216 has received the API call from the client 204, the virtual computer system service 216 may access an identity management service 218 to determine the corresponding delegated access permissions for the customer or other user based at least in part on the policies obtained from the token provided through the API call from the client 204. The identity management service 218 may create a temporary token specifying these delegated access permissions. This temporary token may be provided to the computing resource service provider 214, which may transmit this temporary token to the virtual computer system service 216 and one or more other services 220 to enforce these delegated access permissions. The virtual computer system service 216, based at least in part on the delegated access permissions, may either deny the customer or other user's request to migrate the one or more virtual machine images to the computing resource service provider 214 network or initiate conversion of the one or more virtual machine images to complete the migration process.

In order to convert the provided one or more virtual machine images for use within the computing resource service provider 214 network, the virtual computer system service 216 may determine, for each of the one or more virtual machine images, the specifications of the virtual machine image in order to determine the resources necessary to store the virtual machine image and, upon selection for instantiation, resources that may need to be provided in order to instantiate the image. The specifications for the virtual machine image may be included as metadata within the virtual machine image itself or as a separate file included with the API call to the virtual computer system service 216. The specifications may specify various performance characteristics and requirements for the virtual machine image. For instance, the specifications may include, but are not limited to: storage capacity required, required RAM, required processing capabilities to operate an instance based at least in part on the virtual machine image, and the like.

The client 204 may monitor the virtual computer system service 216 to determine whether the provided virtual machine images have been converted for use within the computing resource service provider 214 network. For instance, in an embodiment, the client 204 transmits a second set of API calls to the virtual computer system service 216 that may cause the virtual computer system service 216 to respond with the status of the conversion of the provided virtual machine images. If the response specifies that the conversion has been completed, the client 204 may determine that the one or more virtual machine images have been converted properly. Additionally, in response to having determined that the one or more virtual machine images have been migrated properly, the client 204 may update the customer network 202 interface to specify that these one or more virtual machine images have been migrated to the computing resource service provider 214 network and to enable the customer or other user to utilize these one or more virtual machine images to generate a virtual machine instance within the computing resource service provider 214 network. For instance, to demonstrate that the one or more virtual machine images have been successfully migrated to the computing resource service provider 214 network, the client 204 may update the customer network 202 interface to illustrate a graphical representation of the one or more virtual machine images within a computing resource service provider 214 pane, such as the one illustrated in FIG. 1.

Figure 3:
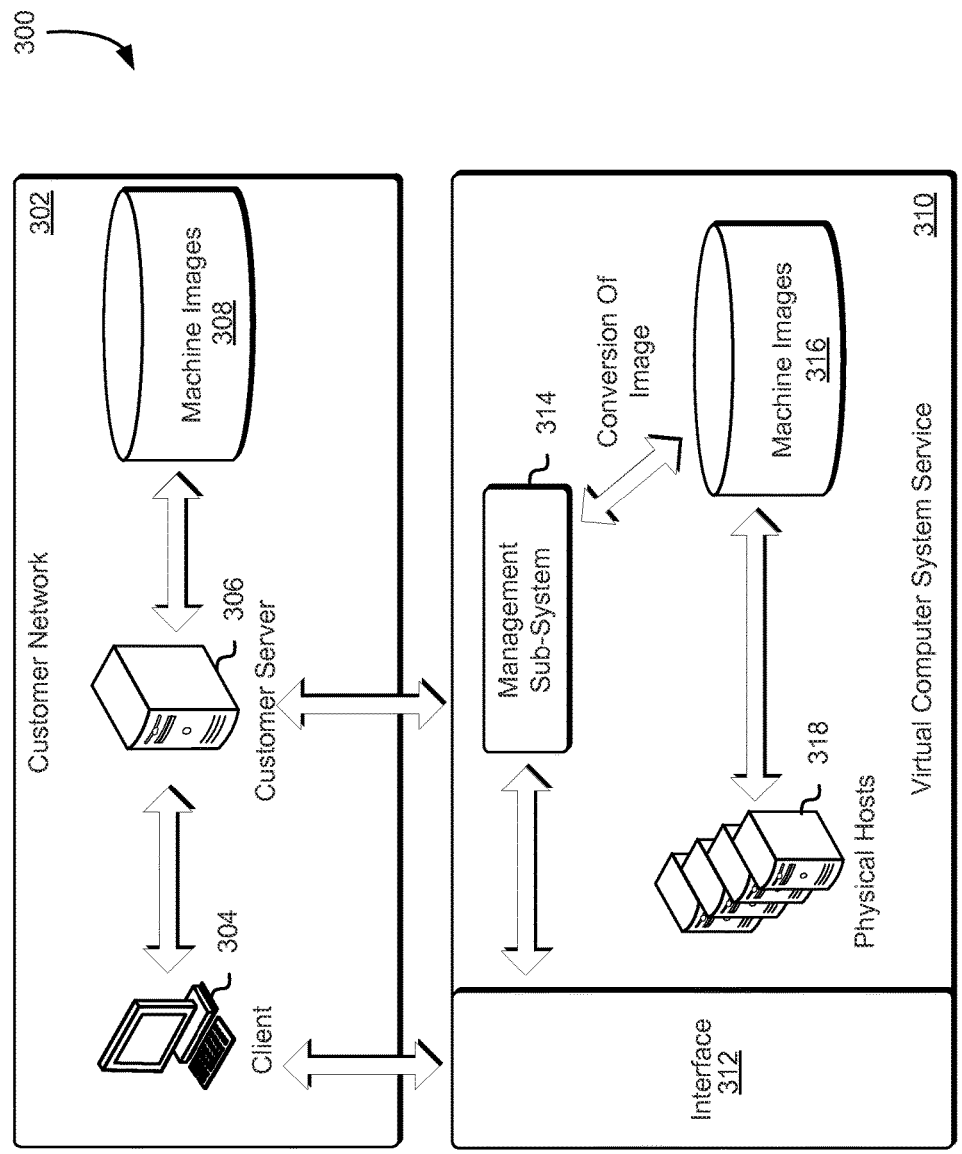
FIG. 3 shows an illustrative example of an environment in which a user client is utilized to migrate one or more virtual machine images from an on-premises network to a computing resource service provider network in accordance with at least one embodiment.

As noted above, a customer or other user may utilize a client within an on-premises network, such as a customer network, to access and utilize one or more virtual machine images within the on-premises network and also within a computing resource service provider network. Additionally, the customer or other user may, through the client, access an interface, which may enable the customer or other user to migrate any virtual machine images from the on-premises network to the off-premises network and vice versa. Accordingly, FIG. 3 shows an illustrative example of an environment 300 in which a user client 304 is utilized to migrate one or more virtual machine images from an on-premises network 302 to a computing resource service provider network in accordance with at least one embodiment. As noted above, the customer network 302 may include a plurality of systems and other components, which may be used by the customer and other users of the customer network 302 to perform one or more operations to support the customer's needs. For instance, the customer network 302 may include a customer server 306. The customer server 306 may include one or more computing hardware devices (e.g., hard drives, RAM, one or more processors, network devices, etc.) collectively configured to enable a user, through a client 304 to access one or more customer systems. Further, the customer network 302 may include a virtual machine image repository 308, which may be used to store one or more virtual machine images that may be used, within the customer network 302, to instantiate a virtual machine instance.

The client 304 may be configured to provide the customer or other user with an interface, which the customer or other user may utilize to migrate one or more virtual machine images stored within the virtual machine image repository 308 to a virtual computer system service 310 provided by the computing resource service provider or other service provider that maintains and manages an off-premises network. In an embodiment, the client 304 communicates with a virtual computer system service 310 through a service interface 312 to determine one or more virtual machine images that are available to the customer or other user within the computing resource service provider (e.g., off-premises) network. For instance, the client 304 may provide the service interface 312 with a token, which may be used by the virtual computer system service 310 to verify the identity of the user and ensure the user has been properly authenticated through the customer network 302. Based at least in part on the information included within the token, the service interface 312 may submit a request to a management sub-system 314 to determine if any virtual machine images within the computing resource service provider network are available for the customer or other user. The management sub-system 314 may determine, based at least in part on one or more identifiers associated with the customer or other user, which virtual machine images stored within the service virtual machine image repository 316 are available to the customer or other user. The management sub-system 314 may provide this information, through the interface 312, to the client 304. The client 304 may utilize this information to populate the customer network 302 interface with a graphical representation of the virtual machine images available to the customer or other user.

Through the client 304, a customer or other user may be able to utilize a cursor within the customer network 302 interface to select a graphical representation of one or more virtual machine images stored within the virtual machine image repository 308 and drag this graphical representation over to a computing resource service provider pane on the customer network 302 interface. This action may be detected by the client 304, which may interpret this action as a request from the customer or other user to migrate the selected virtual machine images to the virtual computer system service 310. While the use of a cursor to drag a graphical representation of one or more virtual machine images and initiate migration of these virtual machine images is used extensively throughout the present disclosure for the purpose of illustration, other actions may be available within the customer network 302 interface to indicate a desire to migrate one or more virtual machine images from the customer network 302 to the virtual computer system service 310. For instance, a customer or other user may utilize the cursor provided by the customer network 302 interface to select a graphical representation of one or more virtual machine images and cause a menu to appear. This menu may include a variety of options available to the customer or other user (e.g., delete selected image, copy selected image, etc.). The menu may further include an option to migrate the selected virtual machine images to the virtual computer system service 310. Thus, if a customer or other user selects this option from within the menu, the client 304 may initiate the migration process for the selected virtual machine images.

Once the client 304 has detected, through the customer network 302 interface, that the customer or other user has requested migration of one or more virtual machine images to the virtual computer system service 310, the client 304 may access, through the customer server 306, the virtual machine image repository 308 within the customer network 302 to obtain the selected virtual machine images. The client 304 may subsequently generate an API call that may be transmitted to the virtual computer system service 310 through the service interface 312. This API call may include the selected virtual machine images, as well as the previously described token. Additionally, in some embodiments, the API call may include one or more licenses or licensing information that may be necessary for the virtual computer system service 310 to, in the future, instantiate the migrated virtual machine instances.

In response to the API call from the client 304, the interface 312 may provide the management sub-system 314 with the token included in the API call to determine whether the customer or other user is authorized to migrate these one or more virtual machine images to the virtual computer system service 310. For instance, the management sub-system 314 may obtain a policy from the token, which the management sub-system may provide to an identity management service to evaluate the policy and determine whether the policy is still valid. If the policy is still valid, the management sub-system 314 may allow migration of the selected virtual machine images to the computing resource service provider network.

As noted above, in an alternative embodiment, the client 304 communicates with the customer server 306, such as through one or more API calls to the customer server 306, to request migration of the selected one or more virtual machine images to the virtual computer system service 310. The customer server 306 may obtain the one or more requested virtual machine images from the virtual machine image repository 308 and transmit one or more API calls to the virtual computer system service 310 to request migration of these one or more requested virtual machine images to the off-premises network. In this particular instance, the management sub-system 314 may receive these one or more API calls from the customer server 306 and perform conversion of the one or more virtual machine images for use within the off-premises network environment.

If the customer or other user is determined to be authorized to migrate the selected virtual machine images to the virtual computer system service 310, the management sub-system 314 may determine the specifications of each of the one or more virtual machine images to identify what computing resources may be necessary to store these virtual machine images and otherwise instantiate these images upon request. Further, the management sub-system 314 may convert these one or more virtual machine images to enable use of these virtual machine images within the computing resource service provider network. For instance, the virtual computer system service 310 may maintain and manage virtual computer systems instantiated on physical hosts 318. The virtual machine images provided to the virtual computer system service 310 by the client 304 may require conversion into a format that may be compatible with these physical hosts 318. Thus, the management sub-system 314 may covert the provided virtual machine images and store these newly converted virtual machine images within the service virtual machine image repository 316.

Once the one or more virtual machine images have been converted and stored within the service virtual machine image repository 316, the management sub-system 314 may update the customer or other user catalog to specify that the converted one or more virtual machine images are now available for use within the virtual computer system service 310. The client 304, which may be configured to monitor the virtual computer system service 310 to ensure that conversion of the provided one or more virtual machine images is performed successfully, may transmit a second set of API calls to the virtual computer system service 310, which may cause the virtual computer system service 310 to respond with the status of the conversion of the virtual machine images. If the response indicates that the virtual machine images have been successfully converted, the client 304 may update the customer network 302 interface to specify that the newly converted virtual machine images are now available for use within the off-premises network. For instance, the customer network 302 interface may now include a graphical representation of the one or more newly converted virtual machine images within a computing resource service provider window pane. This may enable a customer or other user to select a graphical representation of a newly converted virtual machine image and request instantiation of the selected image. While virtual machine images are used throughout the present disclosure for the purpose of illustration, other computing resources available within the customer network 302 may be converted for use within the computing resource service provider network using the methods described above.

It should be noted that the customer network 302 interface may further be used to select a graphical representation of one or more virtual machine images within the virtual computer system service 310 and drag this graphical representation to a customer network 302 window pane within the interface to request migration of these one or more virtual machine images from the virtual computer system service 310 to the customer network 302. The client 304 may submit a request to the virtual computer system service 310, such as through one or more API calls to the service 310, to receive the requested one or more virtual machine images from the service virtual machine image repository 316. Once the client 304 receives the one or more selected virtual machine images, the client 304 may cause the customer server 306 to convert the one or more virtual machine images into a format that is readable by one or more computer systems managed and maintained on the customer network 302 and store these newly converted virtual machine images within the virtual machine image repository 308. Further, the client 304 may update the customer network 302 interface to include a graphical representation of the newly converted virtual machine images within a customer network 302 window pane. This may enable the customer or other user to select a graphical representation of these newly converted virtual machine images and request instantiation of these virtual machine images within the customer network 302.

As noted above, the customer network, through a client device, may provide customers and other users access to the customer network and, if permitted, the computing resource service provider network through an interface. This interface may be utilized by customers or other users of the customer network to migrate virtual machine images and other computing resources from the customer network to the computing resource service provider network and vice versa. Accordingly, FIG. 4 shows an illustrative example of an environment 400 that includes a client interface 402 usable for migrating one or more virtual machine images from an on-premises network, such as the aforementioned customer network, to a computing resource service provider network in accordance with at least one embodiment.

The customer network client interface 402 may include one or more elements that may enable a customer or other user to request migration of one or more virtual machine images or other computing resources from a customer network to a computing resource service provider network and vice versa. For instance, the customer network client interface 402 may include one or more window panes 404, 406, which may be used to provide a customer or other user with a graphical representation of the one or more virtual machine images that may be available within the customer network and the computing resource service provider network. While the client interface 402 illustrated in FIG. 4 includes two distinct window panes 404, 406, it should be noted that the client interface 402 may include additional and/or alternative window panes, which may be configured to display other information to the customer or other user of the interface 402. While a GUI is utilized to represent the customer network client interface 402, it should be noted that non-graphical user interfaces may be utilized to request migration of one or more virtual machine images from an on-premises network to an off-premises network and vice versa. For instance, the customer network client interface 402 may comprise an auditory user interface, a tactile user interface and other interfaces.

Figure 4:
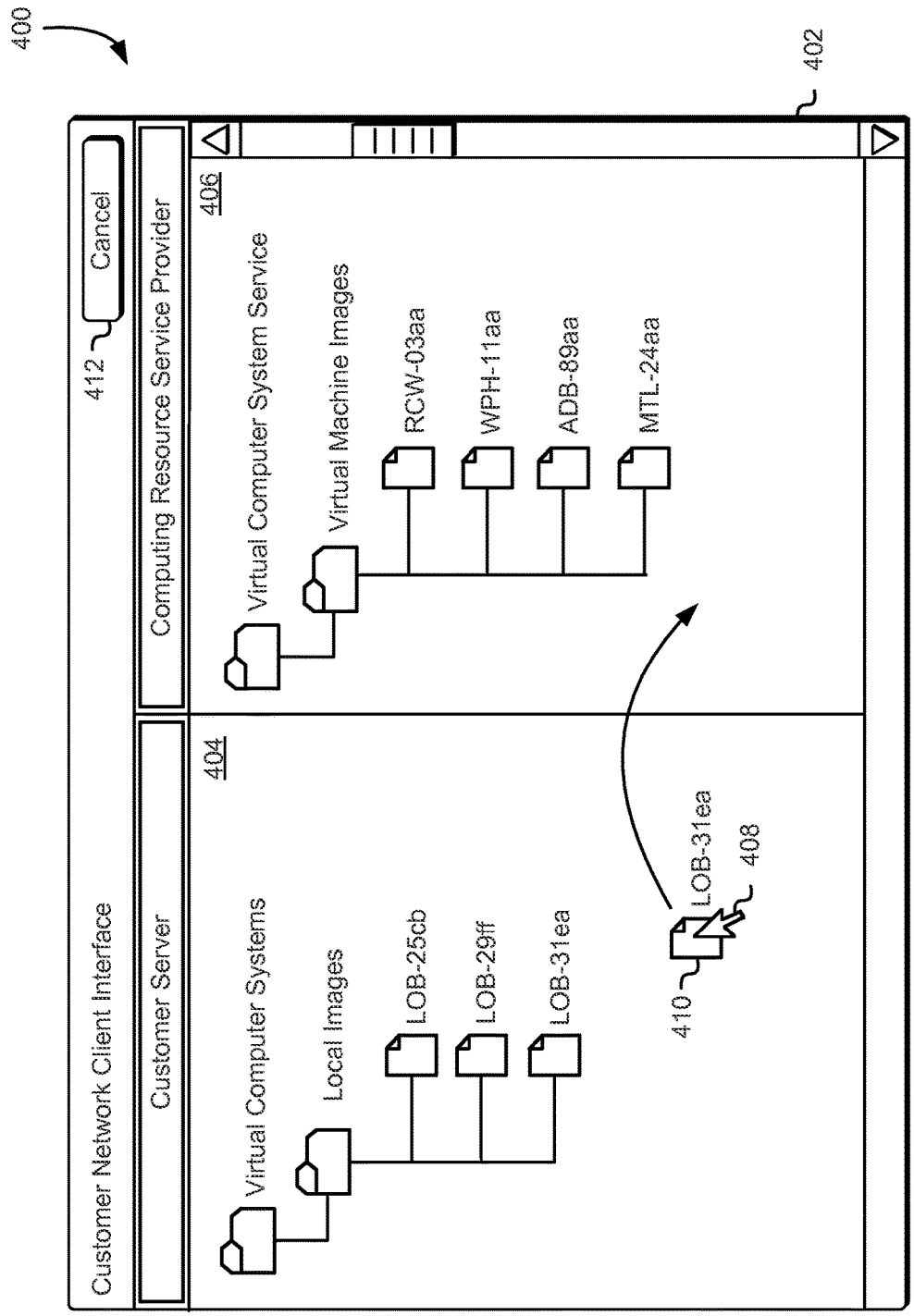
FIG. 4 shows an illustrative example of an environment that includes a client interface usable for migrating one or more virtual machine images from an on-premises network to a computing resource service provider network in accordance with at least one embodiment.

As illustrated in FIG. 4, the customer network client interface 402 may include a customer network window pane 404, which may be configured to display a graphical representation of a set of virtual machine images that may be available to the customer or other user within the customer network. The graphical representation of the set of one or more virtual machine images may be organized in a logical tree structure to specify the location of these one or more virtual machine images within the customer network. While a logical tree structure is used throughout the present disclosure for the purpose of illustration, the graphical representation of the one or more virtual machine images may be presented using other logical structures, such as through iconic representations of each of the one or more virtual machine images within the customer network window pane 404. Further, the graphical representation of the set of one or more virtual machine images may include an icon that represents the set of one or more virtual machine images.

The customer network client interface 402 may further include a computing resource service provider window pane 406, which may be configured to display a graphical representation of one or more virtual machine images that may be available to the customer or other user within the computing resource service provider network. As noted above, a customer network client may be configured to access a virtual computer system service provided by the computing resource service provider to identify one or more virtual machine images that may be available to the particular customer or other user that has utilized the client to access this interface 402. The customer network client may submit one or more API calls to the service that include a customer token, which may enable the virtual computer system service to identify the customer or other user utilizing the customer network client and the virtual machine images that may be available to the customer or other user. The customer network client may receive identification of these one or more virtual machine images and use this identification to generate a graphical representation of these one or more virtual machine images within the computing resource service provider window pane 406.

In an embodiment, the client interface 402 is configured to provide the customer or other user with a cursor 408, which the customer or other user may utilize to interact with the graphical representation of the one or more virtual machine images within the customer network window pane 404 and the computing resource service provider window pane 406. For instance, as illustrated in FIG. 4, a customer or other user may utilize the cursor 408 to select a graphical representation of a virtual machine image 410. Using the cursor 408, a customer or other user may drag the graphical representation of a virtual machine image 410 from the customer network window pane 404 to the computing resource service provider window pane 406 to request migration of the selected virtual machine image. While the use of a cursor 408 to drag a graphical representation of a virtual machine image 410 between window panes 404, 406 is described extensively throughout the present disclosure, alternative methods may be used to request migration of a particular virtual machine image. For instance, in an embodiment, the customer or other user can use the cursor 408 to select a graphical representation of a virtual machine image 410. Subsequently, the customer or other user may click on the selected graphical representation to cause the interface 402 to display a menu. From this menu, the customer or other user may specify that he/she would like to migrate the selected virtual machine instance from one network to another.

The graphical representation of the virtual machine image 410 may represent one or more of the set of virtual machine images available to the customer. Further, the graphical representation of the virtual machine image 410 may include an icon, which may represent one or more virtual machine images from the set of virtual machine images. Alternatively, the graphical representation of the virtual machine image 410 may include a plurality of highlighted (e.g., selected) icons from within the customer network window pane 404. In another instance, the graphical representation of the virtual machine image 410 may include one or more highlighted textual identifiers corresponding to the set of virtual machine images that the customer or other user desires to have migrated to an off-premises network.

When the customer or other user utilizes the cursor 408 to drag and drop a graphical representation of a virtual machine image 410 from the customer network window pane 404 to the computing resource service provider window pane 406, the customer network client may detect this action and proceed to attempt migration of the selected virtual machine image to the virtual computer system service provided by the computing resource service provider. For instance, as noted above, the client, through a customer server within the customer network, may access a virtual machine image repository to obtain the selected virtual machine image. Subsequently, the customer network client may generate and transmit one or more API calls to the virtual computer system service within the computing resource service provider network to request migration of the selected one or more virtual machine images. The one or more API calls may include a customer token, which may specify one or more policies usable to identify delegated access roles for the customer or other user within the computing resource service provider network. Based at least in part on the one or more policies specified within the token, the virtual computer system service may either deny the request or convert and store the virtual machine images within a virtual machine image repository managed by the virtual computer system service.

In an embodiment, the customer network client, upon detection of the action, transmits one or more API calls to the virtual computer system service within the off-premises network to migrate and instantiate the one or more selected virtual machine images. For instance, the one or more API calls may include the selected one or more virtual machine images and the customer token, as described above. The customer token may specify the one or more policies usable to identify the customer's delegated access roles, as described above. However, the customer token may further be used to determine whether the customer is authorized to instantiate the one or more selected virtual machine images within the computing resource service provider network. For instance, if a customer is authorized to migrate these virtual machine images but not instantiate these within the computing resource service provider network, the selected one or more virtual machine images may be migrated successfully but the user may be unable to request instantiation of these one or more virtual machine images from the computing resource service provider window pane 406.

If the customer network client detects, such as through monitoring of the virtual computer system service, that the one or more virtual machine images have been converted and stored within the service provider virtual machine image repository, the customer network client may update the client interface 402 to include a graphical representation of the one or more converted virtual machine images within the computing resource service provider window pane 406. For instance, the graphical representation of the selected virtual machine image 410 may now appear within the logical tree structure for all virtual machine images that may be available to the customer or other user within the computing resource service provider network.

The customer network client interface 402 may additionally include other elements that may be used to enable the customer or other user to perform alternative actions. For instance, as illustrated in FIG. 4, the customer network client interface 402 may include a cancel button 412. The customer or other user may utilize the cursor 408 to select the cancel button 412 and exit the customer network client interface 402 without executing any changes to the virtual machine images within the customer network or the computing resource service provider network.

Figure 5:
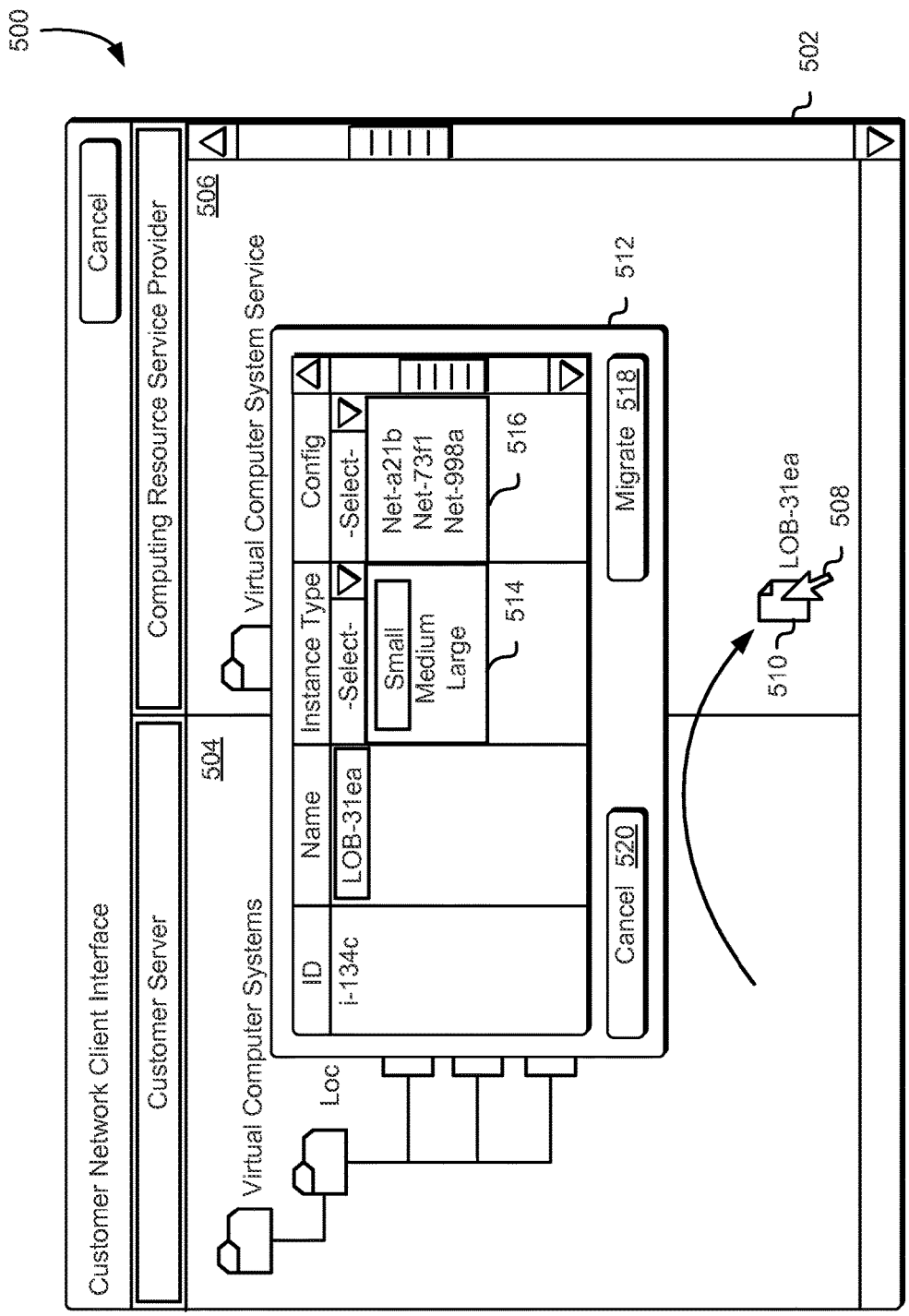
FIG. 5 shows an illustrative example of an environment that includes a client interface wherein a user is presented with one or more options for migration and instantiation of a selected virtual machine image in accordance with at least one embodiment.

In an embodiment, a customer network client is configured to enable customers and other users to utilize an interface to translate (e.g., migrate or copy) one or more existing virtual machine images from a customer network to an off-premises network managed by a computing resource service provider or other entity. Additionally, this interface may be configured to enable a customer or other user to select one or more options for instantiating the selected one or more virtual machine images. This may cause the virtual computer system service provided by the computing resource service provider to utilize the selected one or more options to instantiate the virtual machine image once the virtual machine image has been successfully migrated to the off-premises network. Accordingly, FIG. 5 shows an illustrative example of an environment 500 that includes a client interface 502 wherein a customer or other user is presented with one or more options for migration and instantiation of a selected virtual machine image 510 in accordance with at least one embodiment. The customer network client interface 502 may be similar to the customer network client interface described above in connection with FIG. 4

As illustrated in FIG. 5, a customer or other user has utilized the cursor 508 to drag and drop a graphical representation of a virtual machine image 510 from the customer network window pane 504 to a computing resource service provider window pane 506. In this particular embodiment, these one or more actions performed by the customer or other user causes the client interface 502 to display a migration display box 512, which the customer or other user may utilize to select one or more options for instantiating the selected one or more virtual machine images 510 within the off-premises network managed by the computing resource service provider. For instance, as illustrated in FIG. 5, the migration display box 512 may include four separate display windows, although in some embodiments the migration display box 512 may include additional, fewer or alternative display windows dependent upon the configuration of the client interface 502.

The migration display box 512 may include two separate display windows which may be used to specify one or more identifiers for the selected virtual machine image 510. For instance, the migration display box 512 may be configured to display the customer network identifier for the selected virtual machine image 510 as well as an identifier for the selected virtual machine image 510 within the off-premises network. This second identifier may be used to identify the virtual machine instance that is to be created as a result of the migration of the selected virtual machine image 510.

The migration display box 512 may include an instance type drop-down menu 514, which may be used by the customer or other user to select the instance type for instantiating the selected virtual machine instance 510. The instance type may correspond to particular types of block-level data storage volumes that, in turn, may be mounted as storage devices (e.g., hard drive) onto a virtual machine instance instantiated from the selected virtual machine image 510. Based at least in part on the selection made through the instance type drop-down menu 514, the virtual computer system service may interact with a block-level data storage service to provision the one or more block-level data storage volumes for instantiation of the selected virtual machine image 510. In addition to the instance type drop-down menu 514, the migration display box 512 may include a network configuration drop-down menu 516, which the customer or other user may utilize to configure the network operability of the virtual machine instance to be instantiated from the selected virtual machine image 510. The options included within the network configuration drop-down menu 516 may be provided based at least in part on a customer or other user selection of an instance type from the instance type drop-down menu 514 or independent of the customer other user selection of the instance type. While drop-down menus are used extensively throughout the present disclosure for the purpose of illustration, other methods may be utilized to present a customer or other user with options for instantiating the selected virtual machine image 510 within the off-premises network. For instance, instead of making use of drop-down menus to display the various options available to the customer or other user for instantiating the selected virtual machine image 510, the migration display box 512 may simply display all options within the appropriate display windows.

The migration display box 512 may additionally include other elements that may be used to enable the customer or other user to perform alternative actions. For instance, as illustrated in FIG. 5, the migration display box 512 may include a migrate button 518. The customer or other user may utilize the cursor 508 to select the migrate button 518 to cause the customer network client interface 502 to generate metadata corresponding to the selected virtual machine image 510 and initiate migration and instantiation of the selected virtual machine image 510 within the off-premises network. The metadata may include the particular instance type, network configuration and other information that may be used by the virtual computer system service to provision the necessary resources to instantiate the virtual machine image 510 and configure the new virtual machine instance according to the customer or other user's specifications. The migration display box 512 may further include a cancel button 520, which the customer or other user may utilize to exit the migration display box 512 without executing any changes to the virtual machine images within the customer network or the computing resource service provider network.

Figure 6:
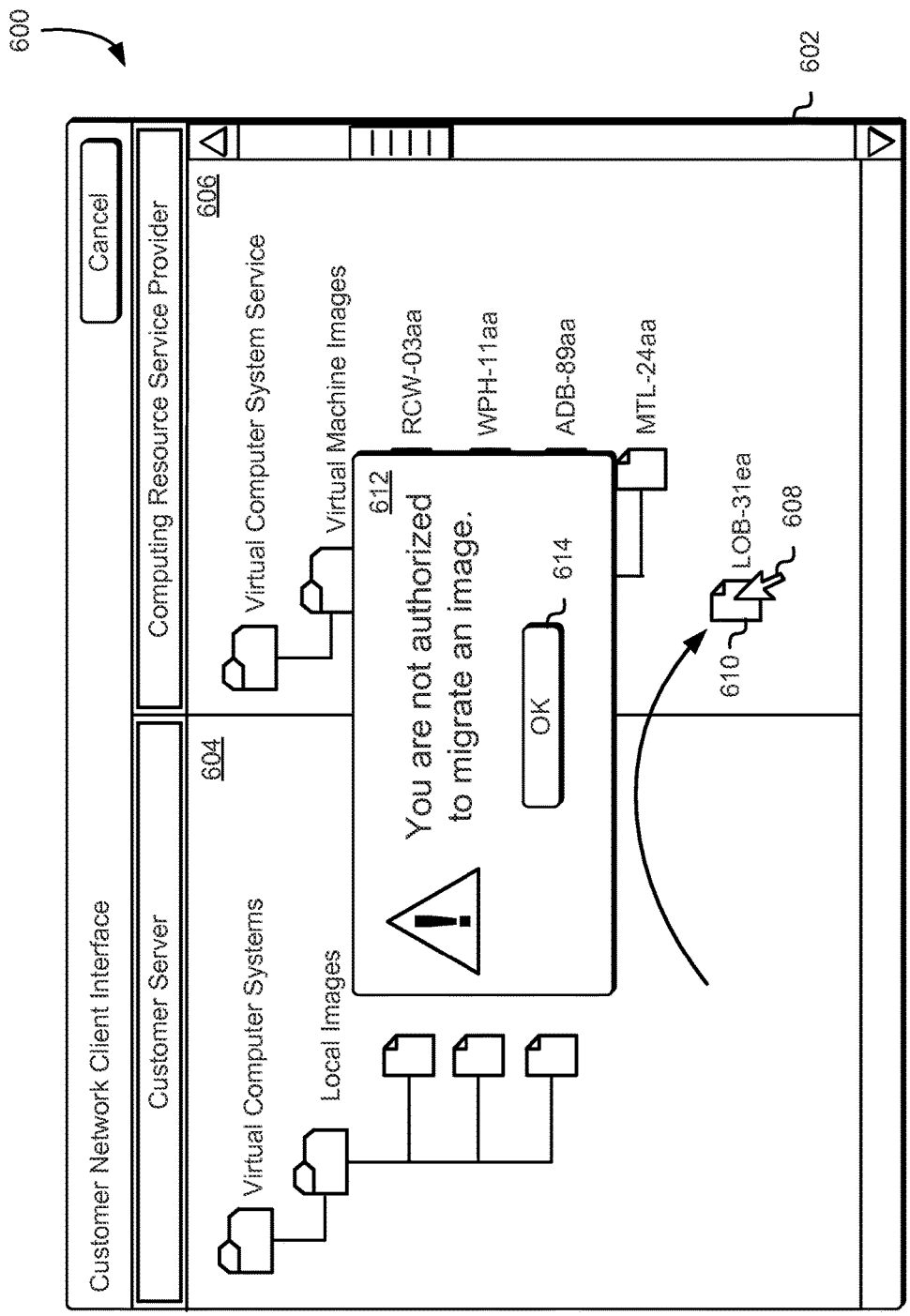
FIG. 6 shows an illustrative example of an environment that includes a client interface wherein a user is not authorized to migrate a virtual machine image to a computing resource service provider network in accordance with at least one embodiment.

As noted above, a customer network client may communicate with a virtual computer system service provided by a computing resource service provider, such as through one or more API calls to the service, to request migration of one or more virtual machine images from the customer network to the computing resource service provider network. However, if the customer or other user is not authorized to migrate certain virtual machine images to the computing resource service provider network, the virtual computer system service may deny the request and cause the customer network client interface to display a message indicating that the customer or other user is not authorized to perform such actions. Accordingly, FIG. 6 shows an illustrative example of an environment 600 that includes a client interface 602 wherein a user is not authorized to migrate a virtual machine image to a computing resource service provider network in accordance with at least one embodiment. The customer network client interface 602 may be similar to the customer network client interface described above in connection with FIG. 4.

As illustrated in FIG. 6, a customer or other user has utilized the cursor 608 to drag and drop a graphical representation of a virtual machine image 610 from the customer network window pane 604 to a computing resource service provider window pane 606. As a result, the customer network client may obtain the selected virtual machine image from the customer network virtual machine image repository. Additionally, the customer network client may communicate with a virtual computer system service provided by a computing resource service provider, such as through one or more API calls to the service, to request migration of the selected virtual machine image to the computing resource service provider network. The one or more API calls may include a token, which may specify one or more policies usable to identify delegated access roles for the customer or other user within the computing resource service provider network. Based at least in part on the one or more policies specified within the token, the virtual computer system service may either deny the request or convert and store the virtual machine images within a virtual machine image repository managed by the virtual computer system service. In this particular instance, the virtual computer system service has determined, based at least in part on the one or more policies specified within the token, that the customer or other user is not authorized to migrate the selected one or more virtual machine images to the computing resource service provider network.

Upon determining that the customer or other user is not authorized to migrate the selected one or more virtual machine images to the computing resource service provider network, the virtual computer system service may transmit one or more API calls to the customer network client to cause the customer network client to display, within the client interface 602, one or more display boxes 612 specifying that the request has been denied. For instance, as illustrated in FIG. 6, the display box 612 may specify that the customer or other user is not authorized to migrate the selected one or more virtual machine images. Additionally, the display box 612 may include additional elements, which the customer or other user may interact with in order to continue utilizing the interface 602. For instance, the display box 612 may include one or more buttons 614, which may enable the customer or other user to utilize the cursor 608 to select the one or more buttons 614 and dismiss the display box 612. While display boxes are used extensively throughout the present disclosure for the purpose of illustration, other methods may be utilized to inform the customer or other user that his/her request to migrate a particular virtual machine image has been denied. For instance, the graphical representation of the virtual machine images that cannot be migrated may include an iconic representation of a lock or some other feature that may serve to notify the customer or other user that he/she is not authorized to manipulate the selected virtual machine image.

Figure 7:
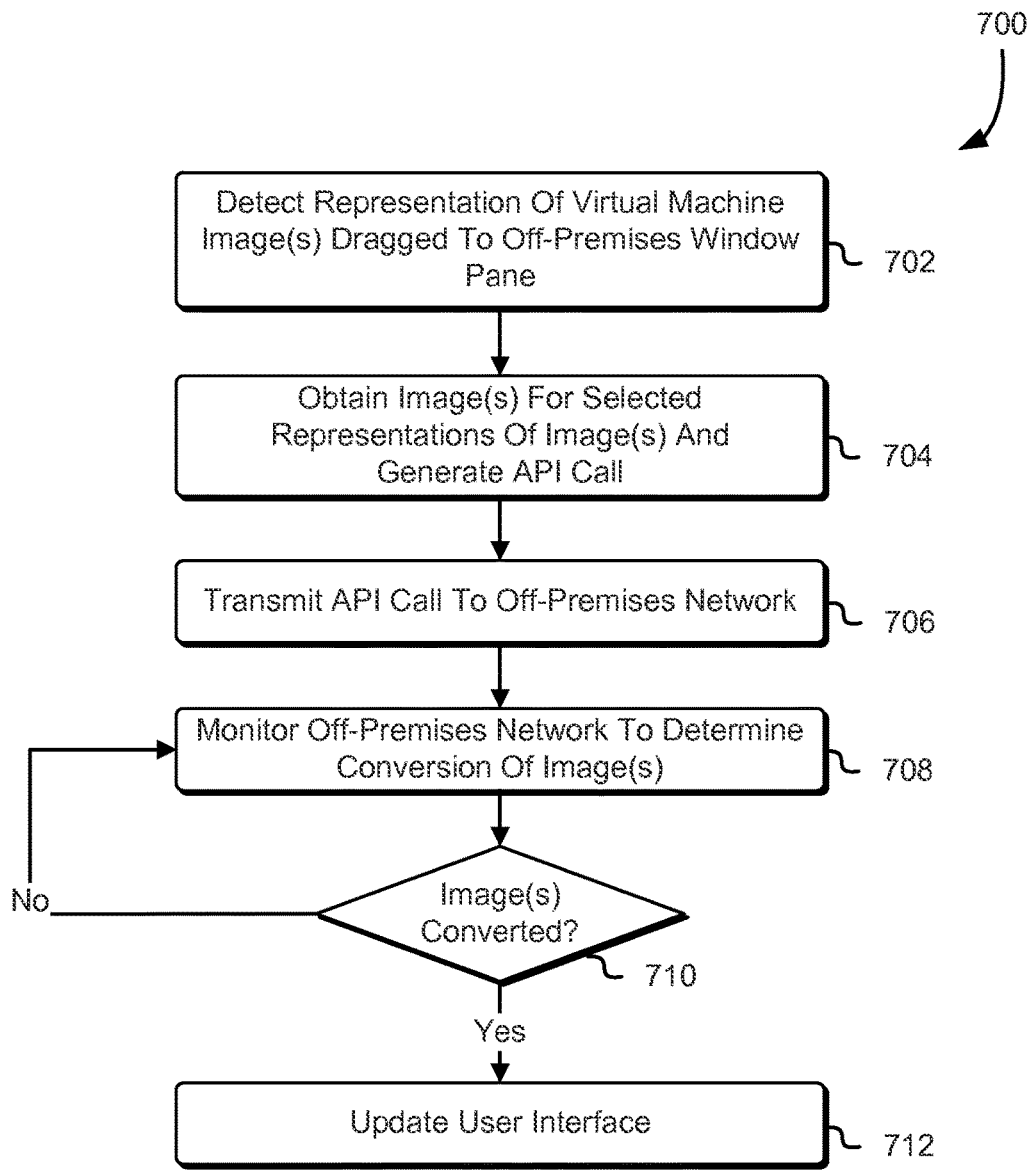
FIG. 7 shows an illustrative example of a process for migrating one or more virtual machine images to an off-premises network upon detection of representations of the one or more virtual machine images being dragged to an off-premises window pane in accordance with at least one embodiment.

As noted above, a customer or other user may utilize a customer network client interface to request migration of one or more virtual machine images from the customer network to the computing resource service provider network and vice versa. In response to this request, the customer network client may communicate with a virtual computer system service to perform the migration of the selected one or more virtual machine images. Accordingly, FIG. 7 shows an illustrative example of a process 700 for migrating one or more virtual machine images to an off-premises network upon detection of representations of the one or more virtual machine images being dragged to an off-premises window pane in accordance with at least one embodiment. The process 700 may be performed by the aforementioned customer network client, which may be configured to detect customer or other user interactions with a client interface within the customer network. Additionally, the customer network client may be configured to obtain virtual machine images from a customer network virtual machine image repository and communicate with a virtual computer system service provided by a computing resource service provider to request and monitor migration of these virtual machine images.

In some embodiments, a customer or other user may utilize a cursor within a customer network interface to drag a graphical representation of one or more virtual machine images from a customer network window pane to a computing resource service provider window pane. By doing so, a customer or other user may be requesting migration of the virtual machine images represented by the graphical representation from the customer network to the computing resource service provider network. The customer network client, which may be configured to provide access to this customer network interface, may detect 702 that the graphical representation of these one or more virtual machine images has been dragged and dropped to an off-premises window pane, such as the computing resource service provider window pane described above.

Once the customer network client has detected that a customer or other user has requested, through interaction with the customer network interface, migration of one or more virtual machine images, the customer network client may access a virtual machine image repository to obtain 704 the selected one or more virtual machine images and generate one or more API calls for the off-premises virtual computer system service. The one or more generated API calls may include the selected one or more virtual machine images, as well as other credential information necessary to determine whether the customer or other user is authorized, within the off-premises network, to have the selected one or more virtual machine images migrated to the off-premises network on his/her behalf. For instance, the one or more API calls may include one or more tokens, which may specify one or more policies defining permissions for the customer or other user within the off-premises network, as well as other information that may be used by the off-premises network to verify the authentication of the customer (e.g., secret signing key). The off-premises network may evaluate the policy within the token to determine whether the policy is still valid. If the policy is still valid, the off-premises network may allow migration of the selected one or more virtual machine images to the off-premises network. The virtual computer system service may generate a set of API calls, wherein each API call of the set of API calls may correspond to a particular virtual machine image of the set of virtual machine images that are to be migrated to the off-premises network. Alternatively, the virtual computer system service may generate a single API call that includes the set of virtual machine images that are to be migrated.

The customer network client may transmit 706 these one or more API calls to the off-premises network, which may cause the virtual computer system service within this off-premises network to begin conversion of the selected one or more virtual machine images for use and storage within a virtual machine image repository provided within the off-premises network. For instance, as will be described in greater detail in connection with FIG. 8, the virtual computer system service may identify the specifications for each of the one or more selected virtual machine images and, based on these specifications, perform the conversion of these one or more selected virtual machine images. As the virtual computer system service converts these selected one or more virtual machine images for use within the off-premises network, the customer network client may monitor 708 the off-premises network to ensure that the conversion of these selected one or more virtual machine images is performed successfully.

In an embodiment, the customer network client adds the one or more virtual machine images to a queue, which may be used to transmit a selected number of virtual machine images to the off-premises network at any given time. For instance, the customer network client may access the queue to obtain a particular number of virtual machine images from the set of virtual machine images to be transmitted to generate an API call to be transmitted to the off-premises network. This API call may include the particular number of virtual machine images from the queue. Once the customer network client has transmitted this API call to the off-premises network, the customer network client may again access the queue to retrieve a next particular number of virtual machine images from the set and generate a new API call. This may prevent excessive usage of network resources in transmitting a substantial number of virtual machine images from the customer network to the off-premises network.

In order to determine 710 whether the one or more selected virtual machine images have been successfully converted for use within the off-premises network, the customer network client may transmit a second set of API calls to the virtual computer system service that may cause the virtual computer system service to respond with the status of the conversion of the provided virtual machine images. For instance, if the virtual computer system service responds to the second set of API calls by specifying that the conversion is still in process, the customer network client may determine that the one or more selected virtual machine images have not been converted. This may cause the customer network client to continue to monitor 708 the off-premises network to determine the status of the conversion of these one or more virtual machine images.

If the one or more selected virtual machine images have been successfully converted (e.g., the virtual computer system service has specified that the conversion has been successfully completed), the customer network client may update 712 the customer network interface to specify that the one or more selected virtual machine images are now available to the customer or other user within the off-premises network. For instance, the customer network client may cause the interface to include a new graphical representation of the one or more converted virtual machine images within an off-premises window pane. This new graphical representation may be utilized by the customer or other user to instantiate these one or more newly converted virtual machine images within the off-premises network.

It should be noted that the process 700 may be performed utilizing additional and/or alternative operations. For instance, in an embodiment, the customer network client may receive, in response to a request to convert the one or more selected virtual machine images and from the virtual computer system service, a job identifier. In order to monitor 708 the off-premises network to ensure that the conversion of these selected one or more virtual machine images is performed successfully, the customer network client may submit a second set of API calls that include the job identifier to the virtual computer system service. If the virtual computer system service indicates that the conversion of the virtual machine images has been completed, the customer network client may obtain a customer catalog specifying the one or more virtual machine images that may be available within the off-premises network. In an alternative embodiment, the customer network client may monitor 708 the off-premises network by requesting the customer catalog to determine whether the one or more provided virtual machine images are specified within the catalog.

In an embodiment, the client converts the selected one or more virtual machine images to an alternative format to facilitate transmission of the one or more virtual machine images to the off-premises network. For instance, the client may convert the selected one or more virtual machine images to an Open Virtualization Format (OVF) and may be included in an OVF package for transmission to the off-premises network. This OVF package may include one or more additional files. For instance, the OVF package may include an Extensible Markup Language (XML) file that includes metadata for the OVF package. This XML file may include the hardware specifications for each of the one or more virtual machine images included within the OVF package. Additionally, the OVF package may include the one or more tokens, which may be used to authorize and authenticate the user submitting the request for migration of the one or more virtual machine images. Conversion of the virtual machine images to OVF may facilitate transfer of the virtual machine images to the off-premises network, as the conversion to OVF involves compression of the virtual machine images to reduce the amount of data that must be transmitted to the off-premises network.

In another embodiment, the conversion of the one or more selected virtual machine images is performed within the customer network. For instance, the customer network client may transmit one or more API calls to a customer server, which may cause the customer server to obtain the selected one or more virtual machine images from a virtual machine image repository and convert these one or more virtual machine images into a format that is readable by the virtual computer system service provided by the computing resource service provider in the off-premises network. Subsequently, the customer server or the customer network client may generate and transmit one or more API calls to the off-premises network to provide the converted virtual machine images. Thus, in this particular embodiment, the customer network client does not necessarily monitor 708 the off-premises network to determine 710 whether the one or more virtual machine images have been converted.

Figure 8:
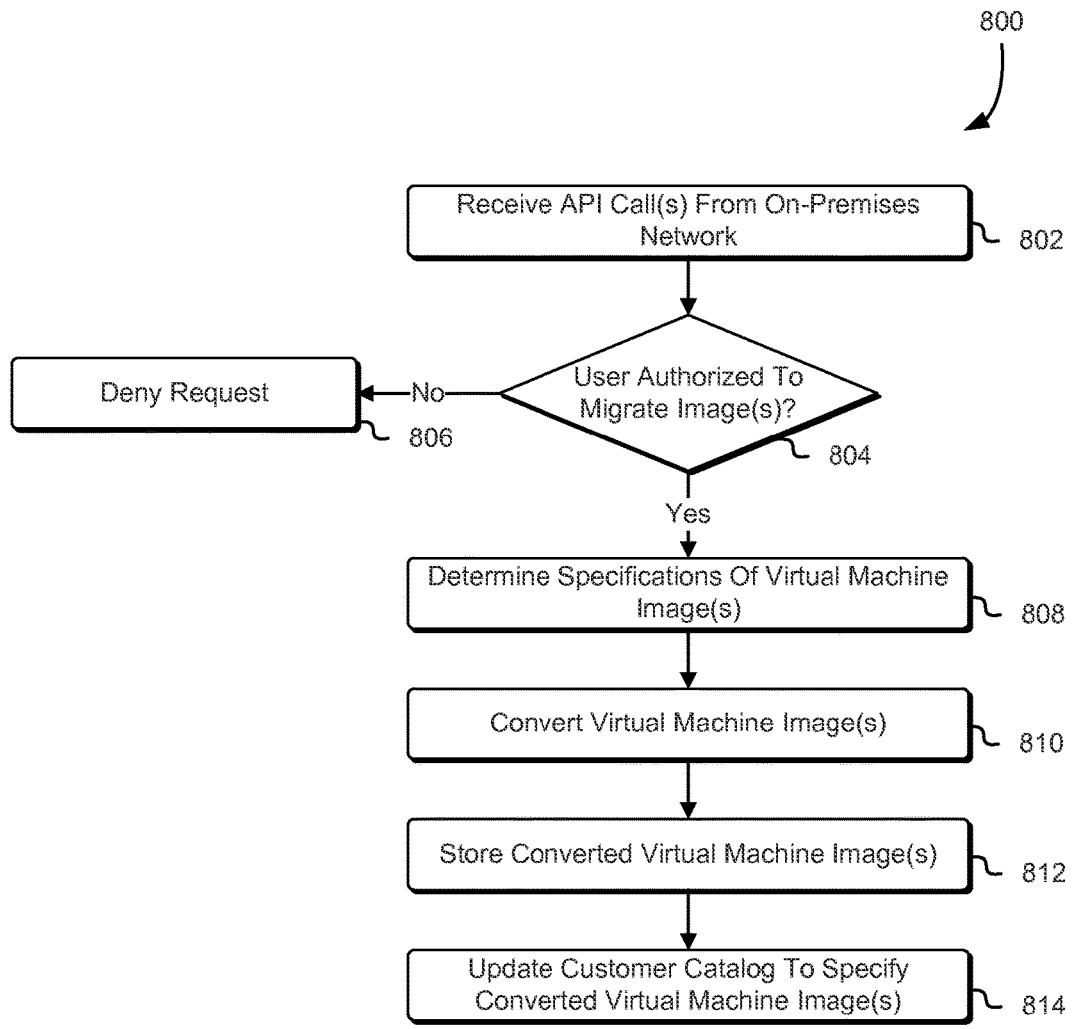
FIG. 8 shows an illustrative example of a process for receiving and converting one or more virtual machine images received from an on-premises network for use within an off-premises network in accordance with at least one embodiment.

As noted above, a virtual computer system service provided by a computing resource service provider or other off-premises service provider may, upon request, convert and store one or more virtual machine images provided by a customer network client. Prior to converting these one or more virtual machine images, the virtual computer system service may determine whether the customer or other user that originally submitted the request through the customer network client is authorized to have the request fulfilled. Accordingly, FIG. 8 shows an illustrative example of a process 800 for receiving and converting one or more virtual machine images received from an on-premises network for use within an off-premises network in accordance with at least one embodiment. The process 800 may be performed by the aforementioned virtual computer system service, which may be configured to communicate with an on-premises (e.g., customer network) client to receive the one or more virtual machine images that are to be converted and to cause the client to perform certain actions in the event that the migration of the one or more virtual machine images cannot be performed. Further, the virtual computer system service may be configured to communicate with an identity management service to identify the delegated access roles for the customer or other user that, through the customer network client, submitted the request to convert the one or more virtual machine images for use within the off-premises network.

When a customer or other user utilizes a customer network interface to request migration of one or more virtual machine images from an on-premises network to the off-premises network, a customer network client may obtain the one or more selected virtual machine images and generate one or more API calls for the virtual computer system service. These one or more API calls may include the one or more selected virtual machine images, as well as one or more tokens that may be used to verify the identity of the customer or other user and determine whether the customer or other user is authorized to have his/her request fulfilled. Thus, the virtual computer system service may receive 802 one or more API calls from the on-premises network, which may include a request to convert one or more virtual machine images for use within the off-premises network.

Once the virtual computer system service receives the one or more API calls from the customer network client, the virtual computer system service may determine 804 whether the customer or other user is authorized to migrate the one or more provided virtual machine images to the off-premises network. As noted above, the one or more API calls may include one or more tokens associated with the customer or other user that provided the request for migration of the one or more virtual machine images. The one or more tokens may specify one or more policies defining permissions for the customer or other user within the off-premises network, as well as other information that may be used by the virtual computer system service to verify the authentication of the customer or other user (e.g., secret signing key). The virtual computer system service, through an identity management service, may evaluate the policy within the token to determine whether the policy is still valid.

If the policy specified within the one or more tokens is not valid, or the customer or other user is not authorized to perform this migration, the virtual computer system service may deny 806 the request from the customer network client. For instance, the virtual computer system service may transmit one or more API calls to the customer network client that may cause the customer network client, through the customer network interface, to display an error message to the customer or other user indicating that he/she is not authorized to perform migration of the selected virtual machine images. It should be noted that in some instances, a customer or other user may be permitted to migrate certain virtual machine images and not others. Thus, the virtual computer system service may deny migration of any virtual machine images that the customer or other user is not authorized to perform while allowing migration of any other virtual machine images for which the customer or other, through the one or more policies included within the token, is permitted to migrate.

If the customer or other user is authorized to migrate the provided one or more virtual machine images, the virtual computer system service may determine 808 the specifications of the provided virtual machine images. As noted above, the virtual computer system service may include one or more physical hosts, which may be used to instantiate the one or more provided virtual machine images upon request. In order to determine which physical hosts may be utilized for instantiation of these virtual machine images, the virtual computer system service may need to identify the specifications for these one or more virtual machine images. Additionally, the virtual computer system service may utilize these specifications to provide the customer or other users with information regarding these virtual machine images in the event that the customer or other users want to instantiate these virtual machine images.

As noted above, the virtual computer system service may include one or more physical hosts, which may be used to instantiate one or more virtual machine images upon request. In order to make the provided one or more virtual machine images compatible for use with these physical hosts, the virtual computer system service may convert 810 the one or more virtual machine images into a format that may be readable by the one or more physical hosts provided by the virtual computer system service. For instance, the virtual computer system service may convert the one or more virtual machine images for storage into one or more data volumes, which may be used, within the off-premises network, to instantiate the one or more virtual machine images. If the one or more virtual machine images are to be instantiated upon receipt by the virtual computer system service, the virtual computer system service may modify these one or more virtual machine images to make these virtual machine images bootable within the off-premises network. Once the virtual computer system service has converted the one or more virtual machine images, the virtual computer system service may store 812 these one or more converted virtual machine images within a virtual machine image repository for use by customers or other users within the off-premises network.

Once the virtual computer system service has stored the one or more converted virtual machine images within the virtual machine image repository provided by the off-premises network, the virtual computer system service may update 814 a customer catalog to specify that the newly converted virtual machine images are available for use. This customer catalog may be made available to other entities, such as the customer/other users and the customer network client, which may utilize this customer catalog to determine whether the provided one or more virtual machine images have been converted successfully for use within the off-premises network.

It should be noted that the process 800 may be performed utilizing additional and/or alternative operations. For instance, in an embodiment, the virtual computer system service obtains, from the one or more virtual machine images or the one or more API calls, licensing information associated with the one or more virtual machine images. These licenses may specify which entities, such as the customer or other users, are authorized to utilize the virtual machine image. The virtual computer system service may utilize these licenses to generate one or more policies, which may be used to define a level of access to the provided one or more virtual machine images for the customer and other users that may desire to instantiate any of the provided one or more virtual machine images.

In another embodiment, the virtual computer system service obtains, from the customer network client or the customer server, one or more virtual machine images that have been converted for use within the computing resource service provider (e.g., off-premises) network. If these one or more virtual machine images have already been converted (e.g., within the on-premises network), the virtual computer system service may not be required to convert 810 virtual machine images for use within the off-premises network. Thus, after the virtual computer system service has determined the specifications of the provided one or more virtual machine images, the virtual computer system service may store 812 these virtual machine images within a virtual machine image repository within the off-premises network. Further, in some embodiments, if the customer is authorized to instantiate these one or more virtual machine images within the off-premises network, the virtual computer system service may additionally instantiate these virtual machine images for the customer. Thus, a customer may be able to utilize a virtual machine instance created using one or more of these virtual machine images upon dragging and dropping a representation of these virtual machine images from the on-premises window pane to the off-premises window pane.

In some embodiments, the permissions for the customer or other user may be managed on-premises, wherein the customer network client may utilize these permissions to determine whether the customer or other user is authorized to request migration of the selected one or more virtual machine images. For instance, the customer network client may manage and maintain, for each customer or other user, a set of credentials that are usable to perform one or more operations within the on-premises and off-premises networks. However, the customer network client may utilize a user identifier to determine whether the customer or other user is authorized to utilize these credentials to request the migration of the one or more virtual machine images.

Figure 9:
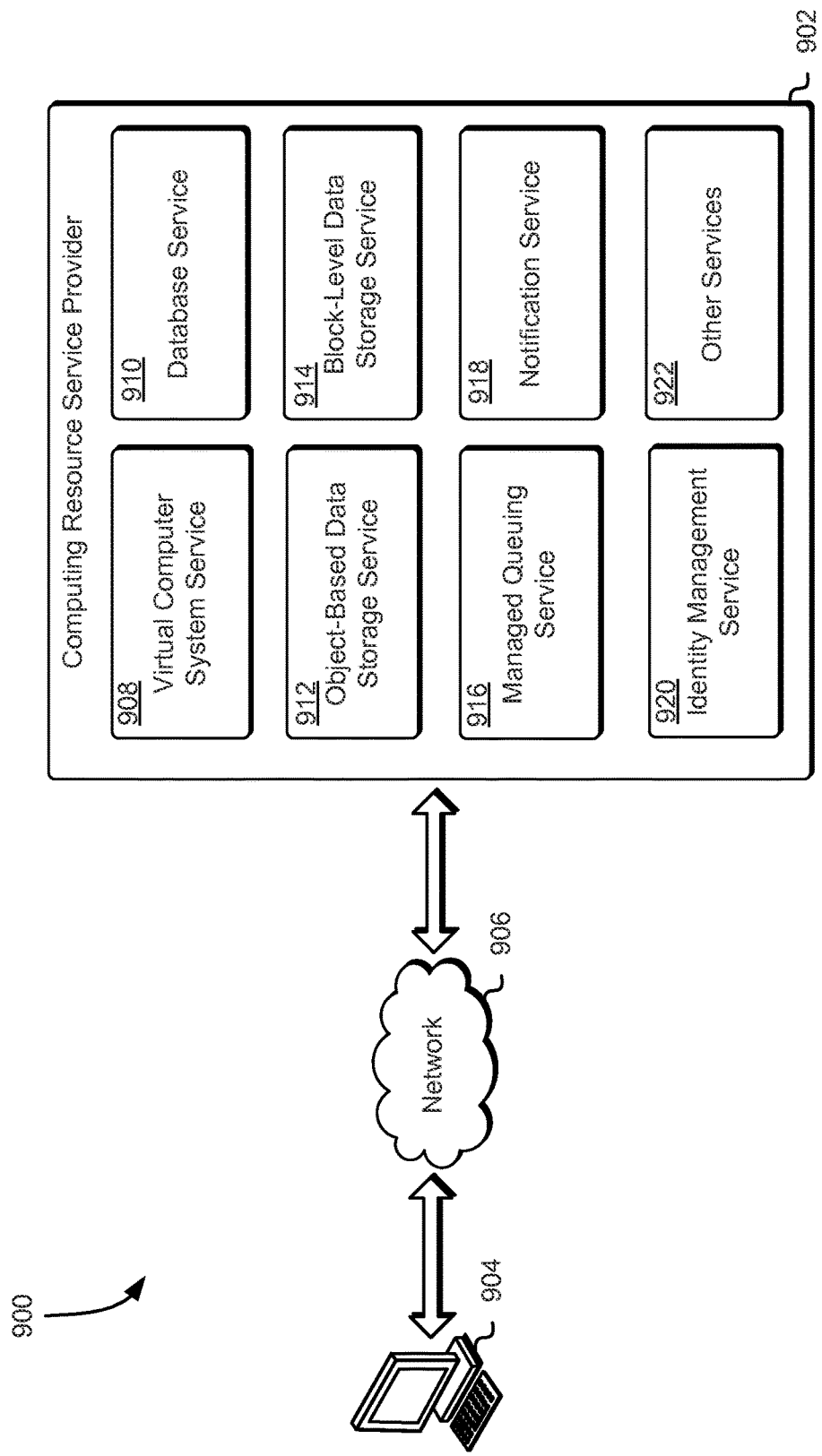
FIG. 9 shows an illustrative example of an environment in which various embodiments can be implemented.

FIG. 9 shows an illustrative example of an environment 900 in which various embodiments can be implemented. In the environment 900, a computing resource service provider 902 may provide a variety of services to a customer 904 or other users. The customer 904 may be an organization that may utilize the various services provided by the computing resource service provider 902 to remotely generate and maintain one or more resources and provide a mapping of user roles for use within a customer network to enable management of one or more delegated access permissions to define a level of access for users of his or her resources. As illustrated in FIG. 9, the customer 904 may communicate with the computing resource service provider 902 through one or more communications networks 906, such as the Internet. Some communications from the customer 904 to the computing resource service provider 902 may cause the computing resource service provider 902 to operate in accordance with various techniques described herein or variations thereof.

As noted above, a computing resource service provider 902 may provide various computing resource services to its customers. For instance, in this particular illustrative example, the computing resource service provider 902 provides at least seven types of services. The services provided by the computing resource service provider, in this example, include a virtual computer system service 908, a database service 910, an object-based data storage service 912, a block-level data storage service 914, a managed queuing service 916, a notification service 918, an identity management service 920 and one or more other services 922, although not all embodiments of the present disclosure will include all such services and additional services may be provided in addition to or as an alternative to services explicitly described herein.

The virtual computer system service 908 may be a collection of computing resources configured to instantiate virtual machine instances onto virtual computer systems on behalf of the customers 904 of the computing resource service provider 902. Customers 904 of the computing resource service provider 902 may interact with the virtual computer system service 908 to provision and operate virtual computer systems that are instantiated on physical computing devices hosted (e.g., physical hosts) and operated by the computing resource service provider 902. The virtual computer systems may be used for various purposes, such as to operate as servers supporting a website. Other applications for the virtual computer systems may be to support database applications, electronic commerce applications, business applications and/or other applications.

In an embodiment, the virtual computer system service 908 receives one or more API calls from an on-premises network client, which may include a request to migrate and convert one or more virtual machine images for use within the computing resource service provider 902 network. The one or more API calls may include a token associated with a customer 904 or other user that has submitted a request, through the on-premises network client, to migrate these one or more virtual machine images to the computing resource service provider 902 network. The virtual computer system service 908 may communicate with an identity management service 920 to determine whether the one or more policies specified within the token are still valid and, if so, determine whether the customer 904 or other user is authorized to perform the migration of the one or more virtual machine images.

If the customer 904 or other user is authorized to perform the migration of the one or more virtual machine images, the virtual computer system service 908 may convert and store the one or more provided virtual machine images within a virtual machine image repository. This may enable the customer 904 or other user to access, through the on-premises network client, these one or more virtual machine images within the virtual computer system service 908 and request instantiation of these one or more virtual machine images within the computing resource service provider 902 network.

The database service 910 may be a collection of computing resources that collectively operate to run one or more databases for one or more customers 904. Customers 904 of the computing resource service provider 902 may operate and manage a database from the database service 910 by utilizing appropriately configured API calls. This, in turn, may allow a customer 904 to maintain and potentially scale the operations in the database.

The object-based data storage service 912 may comprise a collection of computing resources that collectively operate to store data for a customer 904. The data stored in the data storage service 912 may be organized into data objects. The data objects may have arbitrary sizes except, perhaps, for certain constraints on size. Thus, the object-based data storage service 912 may store numerous data objects of varying sizes. The object-based data storage service 912 may operate as a key value store that associates data objects with identifiers of the data objects which may be used by the customer to retrieve or perform other operations in connection with the data objects stored by the object-based data storage service 912. Access to the object-based data storage service 912 may be through appropriately configured API calls.

The block-level data storage service 914 may comprise a collection of computing resources that collectively operate to store data for a customer. For instance, the block-level data storage system may be configured to provide block-level data storage volumes for use with a virtual machine instance, as noted above. A customer may interact with the block-level data storage service 914 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The managed queuing service 916 may be a collection of computing resources configured to enable customers 904 to store one or more messages in queues for use by one or more services provided by the computing resource service provider 902. Each message that is stored in a queue may comprise one or more appropriately configured API calls which, when processed by the recipient service, may cause the service to perform one or more actions. Alternatively, each message may comprise any variation of text, such as programming code, URLs for data objects and other statements.

The notification service 918 may be a collection of computing resources configured to enable customers 904 to send and receive notifications through a communications network 906. A customer 904 may utilize an interface, provided by the computing resource service provider 902, to create or subscribe to one or more subjects to which one or more messages may be published through. For instance, a customer 904 may use the interface to create a new subject and subscribe to this subject by specifying that any messages published to the subject may be transmitted to a particular location (e.g., electronic mail address, one or more servers, an existing queue within the managed queuing service 916, etc.). Accordingly, when a customer 904 publishes a message to the subject, the message may be transmitted to each recipient subscribed to the subject.

The identity management service 920 may provide a variety of services to enable customers 904 to define a level of access to other services, such as those illustrated in FIG. 9, provided by the computing resource service provider 902 and to define a level of access to resources provided by the customers 904 and other entities. Accordingly, a customer 904 may access the identity management service 920 to access his/her customer account to create and manage one or more mappings of user roles for defining a level of access to resources within a customer network, which may be used by identity management service 920 to define a level of access to customer resources for users and groups that may utilize the services provided by the computing resource service provider 902. A customer 904 may further utilize the identity management service 920 to generate one or more policies, which may be used to define a level of access to resources and services.

The identity management service 920 may be configured to receive requests from the computing resource service provider 902, as well as one or more user roles obtained from a token provided by a user of the customer network. The identity management service 920 may utilize these user roles, as well as the mapping of user roles from the customer 904 account, to identify one or more delegated access permissions usable to define a level of access to one or more resources within the computing resource service provider 902 network. Accordingly, the identity management service 902 may utilize the newly generated delegated access permissions to create a temporary token usable to enable a user to access customer resources.

Figure 10:
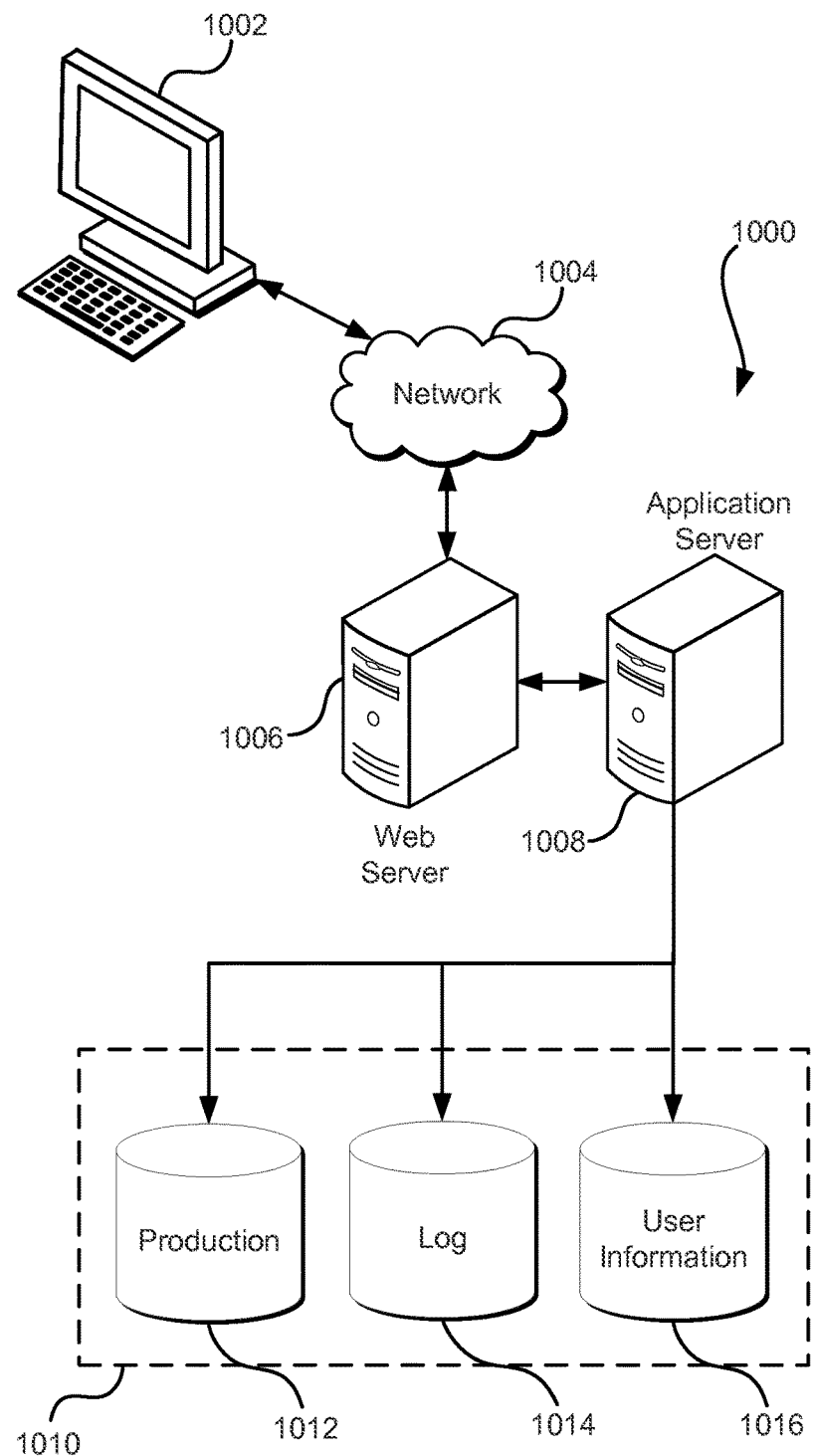
FIG. 10 shows an illustrative example of an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    detecting selection, via a graphical user interface, of a graphical representation of a set of virtual machine images configured for use in an on-premises network and an indication to migrate the set of virtual machine images for use in a network managed by a computing resource service provider, the virtual machine images usable to instantiate virtual machines;
    generating a set of application programming interface calls configured to cause the computing resource service provider to receive the set of virtual machine images and convert the set of virtual machine images from a first format to a second format, the second format readable by the computing resource service provider;
    transmitting the generated set of application programming interface calls to the computing resource service provider;
    monitoring fulfillment of the transmitted set of application programming interface calls to determine a state of fulfillment of the transmitted set of application programming interface calls; and
    updating a portion of the graphical user interface associated with the computing resource service provider to indicate the determined state of fulfillment such that, when the determined state of fulfillment indicates that fulfillment of the set of application programming interface calls, the portion of the graphical user interface associated with the computing resource service provider indicates an ability to instantiate one or more individual virtual machine images on the network managed by the computing resource service provider.

2. The computer-implemented method of claim 1, wherein the selection is a result of a drag-and-drop operation comprising dragging the graphical representation of the set of virtual machine images from a portion of the graphical user interface associated with the on-premises network to the portion of the graphical user interface associated with the computing resource service provider and dropping the graphical representation of the set of virtual machine images in the portion of the graphical user interface associated with the computing resource service provider.

3. The computer-implemented method of claim 1, wherein the set of application programming interface calls includes the set of virtual machine images and one or more tokens usable to authenticate an identity associated with the graphical user interface and specifying one or more policies usable to cause the computing resource service provider to convert the set of virtual machine images.

4. The computer-implemented method of claim 1, wherein monitoring fulfillment of the transmitted set of application programming interface calls includes transmitting a second set of application programming interface calls configured to cause the computing resource service provider to respond with a status of the fulfillment of the transmitted set of application programming interface calls.

5. The computer-implemented method of claim 1, wherein the first format is unreadable by a set of computer systems of the computing resource service provider and the second format is readable by the set of computer systems of the computing resource service provider.

6. The computer-implemented method of claim 1, wherein the application programming interface calls are further configured to cause the computing resource service provider to receive one or more licenses for instantiating the set of virtual machine images.

7. The computer-implemented method of claim 1, wherein the set of application programming interface calls is generated based at least in part on a resource of the computing resource service provider requested for the virtual machines instantiated from the virtual machine images.

8. The computer-implemented method of claim 1, wherein the second format further indicates a resource of the computing resources service provider to be used by a respective instantiated virtual machine, the resource differing from that of the first format.

9. A computer system comprising:
one or more processors; and
memory having collectively stored therein instructions that, upon execution by the computer system, cause the computer system to:
  detect selection, via a user interface, of a representation of a set of computer system images and an indication to translate the set of computer system images to a second computing environment from a first computing environment, the computer system images usable to instantiate computing system instances;
  cause the set of computing system images to be converted from a first format to a second format, the second format readable by the second computing environment;
  transmit the computing system images to the second computing environment; and
  at a time after transmission of the computer system images to the second computing environment, update a portion of the user interface to indicate the availability of one or more individual computer system images of the set of converted computer system images for instantiation in the second computing environment.

10. The computer system of claim 9, wherein the set of computing system images is caused to be converted in the second computing environment.

11. The computer system of claim 9, wherein the instructions further cause the computer system to authenticate and authorize a user of the user interface and, as a result of authenticating and authorizing the user, provide the user with a set of credentials usable to submit a request to translate the set of computer system images.

12. The computer system of claim 9, wherein the selection is a result of a drag-and-drop operation comprising dragging the representation of the set of computer system images from a portion of the user interface associated with the first computing environment to a portion of the user interface associated with the second computing environment and dropping the representation of the set of computer system images in the portion of the user interface associated with the second computing environment.

13. The computer system of claim 9, wherein the request includes the set of computer system images and one or more tokens usable to authenticate a user of the user interface and specifying one or more policies usable to cause the computer system configured to fulfill the request to convert the set of computer system images.

14. The computer system of claim 9, wherein the instructions further cause the computer system to:
  receive one or more notifications from the second computing environment indicating fulfillment of the request; and
  display the one or more notifications via the user interface.

15. The computer system of claim 9, wherein the request includes metadata indicating one or more hardware requirements for instantiation of the computer system images within the second computing environment, the metadata including an instance type to be used within the second computing environment.

16. The computer system of claim 9, wherein the instructions further cause the computer system to queue the set of computer system images such that the set of computer system images are converted and transmitted based at least in part on an ordering of the set of computer system images within the queue.

17. A non-transitory computer-readable storage medium having collectively stored thereon executable instructions that, upon execution by one or more processors of a computer system, cause the computer system to at least:
  in response to selection, via a user interface, of a representation of a set of computer system images and an indication to translate the set of computer system images to a second computing environment from a first computing environment, cause the set of computer system images to be converted from a first format to a second format, the second format readable by the second computing environment, the computer system images usable to instantiate computer system instances;
  transmit the set of converted computer system images to the second computing environment; and
  at a time after transmission of the set of converted computer system images to the second computing environment, provide ability in the user interface to cause one or more converted computer system images of the set of converted computer system images to be instantiated in the second computing environment.

18. The non-transitory computer-readable storage medium of claim 17, wherein the instructions further comprise instructions that, when executed by the one or more processors, cause the computer system to transmit metadata indicating one or more hardware requirements for instantiation of the computer system images within the second computing environment, the metadata including an instance type to be used within the second computing environment.

19. The non-transitory computer-readable storage medium of claim 17, wherein the instructions further comprise instructions that, when executed by the one or more processors, cause the computer system to monitor the second computing environment to determine when the set of converted computer system images are available for instantiation in the second computing environment.

20. The non-transitory computer-readable storage medium of claim 17, wherein the first computing environment is an on-premises network of a customer of a computing resource service provider and the second computing environment is a network managed by the computing resource service provider.

21. The non-transitory computer-readable storage medium of claim 17, wherein the first computing environment is a network managed by a computing resource service provider and the second computing environment is an on-premises network of a customer of the computing resource service provider.

22. The non-transitory computer-readable storage medium of claim 17, wherein the request includes one or more tokens usable in the second computing environment to determine whether a set of permissions managed in the second computing environment allow for translation of the set of converted computer system images.

23. The non-transitory computer-readable storage medium of claim 17, wherein the selection is a result of a drag-and-drop operation comprising dragging the representation of the set of computer system images from a portion of the user interface associated with the first computing environment to a portion of the user interface associated with the second computing environment and dropping the representation of the set of computer system images in the portion of the user interface associated with the second computing environment.

24. The non-transitory computer-readable storage medium of claim 17, wherein the representation of the set of computer system images includes a plurality of icons, each icon of the plurality of icons representing a computer system image of the set of computer system images.

* * * * *